US006669480B2

(12) United States Patent
Chesters

(10) Patent No.: US 6,669,480 B2
(45) Date of Patent: Dec. 30, 2003

(54) TEXT LINE UNDERSCORING AND OVERSCORING METHOD AND IMPLEMENTATION DEVICES

(76) Inventor: Thomas P. Chesters, 1901 Marigold La., Hanover Park, IL (US) 60133

( * ) Notice: Subject to any disclaimer, the term of this patent is extended or adjusted under 35 U.S.C. 154(b) by 30 days.

(21) Appl. No.: 10/151,516

(22) Filed: May 20, 2002

(65) Prior Publication Data

US 2003/0215776 A1 Nov. 20, 2003

(51) Int. Cl.$^7$ .............................................. G09B 17/00
(52) U.S. Cl. ..................................................... 434/178
(58) Field of Search .................................. 434/178, 179, 434/183, 184; 116/47; 362/259; D19/35, 36, 41, 54, 55

(56) References Cited

U.S. PATENT DOCUMENTS

| | | | | |
|---|---|---|---|---|
| D248,863 S | * | 8/1978 | Miyamoto | D19/36 |
| 5,320,063 A | * | 6/1994 | Ogura et al. | 116/288 |
| D378,380 S | * | 3/1997 | Mackin | D19/59 |
| D393,717 S | * | 4/1998 | Brenneman et al. | D24/147 |
| 6,070,987 A | * | 6/2000 | Jarvik | 362/84 |
| 6,070,992 A | * | 6/2000 | Schnell | 362/259 |
| 6,542,437 B1 | * | 4/2003 | Chen | 368/10 |
| 6,575,596 B2 | * | 6/2003 | Butt | 362/259 |

OTHER PUBLICATIONS

Author: Shefter, Harry; Faster Reading self taught; 1966; pp. 53–54; Washington Square Press, New York, NY.
Author: Frank, Stanley D.; The Evelyn Wood 7–Day Speed Reading & Learning Program; 1992; pp. 27–28; Avon Books; New York, NY.

Author: Speedread.org; Some Suggestions for Improving Reading Speed; 2002; p. 1; Internet.

Author: Dubois, Jeanine; Speed Reading; 2002; pp. 1–3; Internet.

Author: Doyle, Dennis; Self–Pacing Methods; 2002; pp. 1–6; Internet.

Author: Selfgrowth,com; Speed Reading Information; 2002; pp. 1–8; Internet.

* cited by examiner

Primary Examiner—Kurt Fernstrom

(57) ABSTRACT

An improved text line underscoring and overscoring method having a graspable control member (21) which may be grasped between the thumb (4) and fingers (5, 6, 7) at a first end (27), and be movably angleably connective at an opposite, connective end (22) with a first non-pointing end (28) of a pointer arm (25) with a second pointing end (26) aligned with a reader's line of sight toward text lines (8) with intervening linear spaces (9), so that when the thumb and fingers twist the control member (21) in alternating directions, the first end of the pointer arm (28) will be urged to rotate, and the second pointing end (26) of the pointer arm (25) will be urged to shuttle left and right, whereby the second pointing end (26) of the pointer arm (25) will be enabled to underscore or overscore text lines to be read.

20 Claims, 5 Drawing Sheets

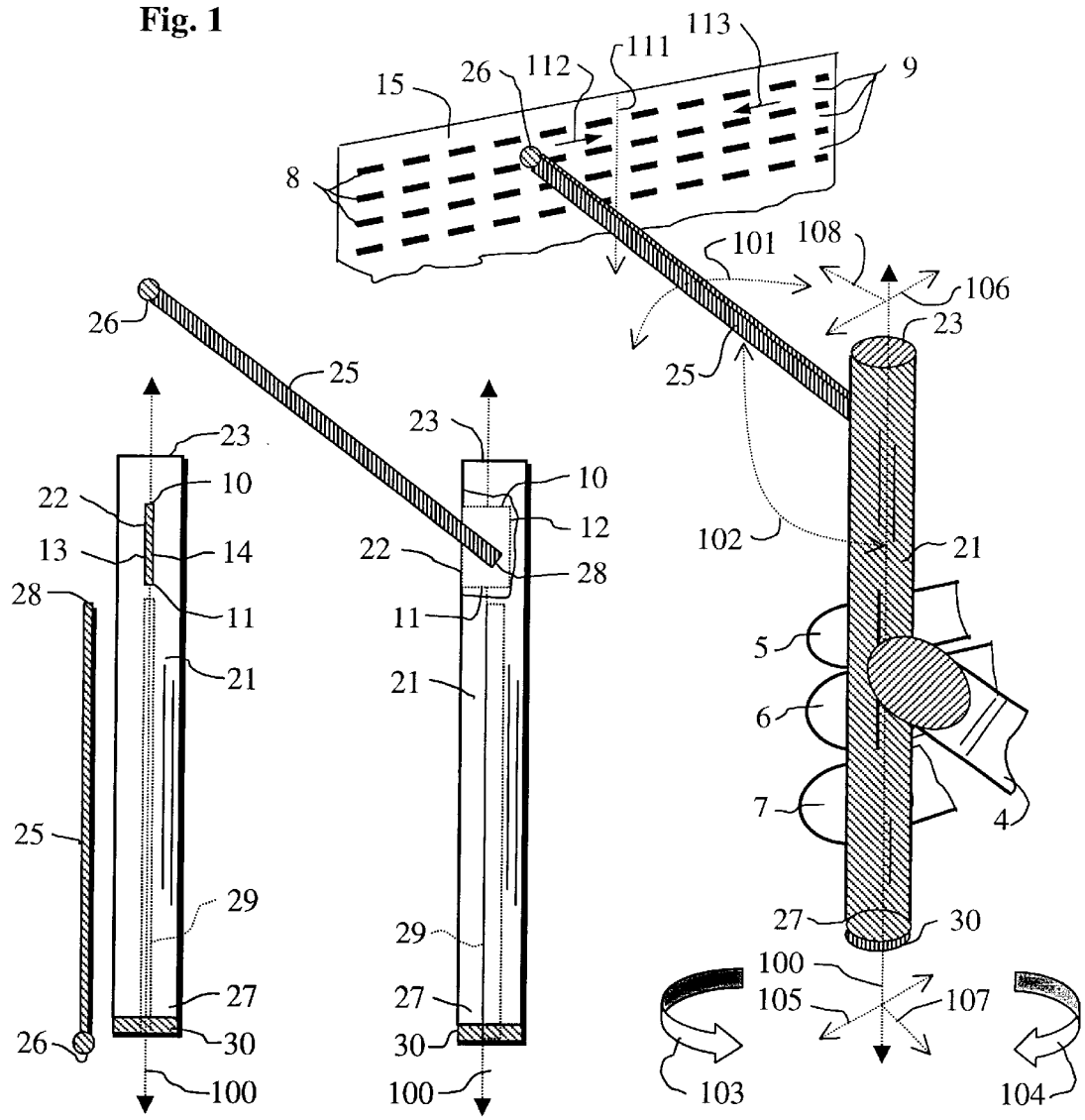

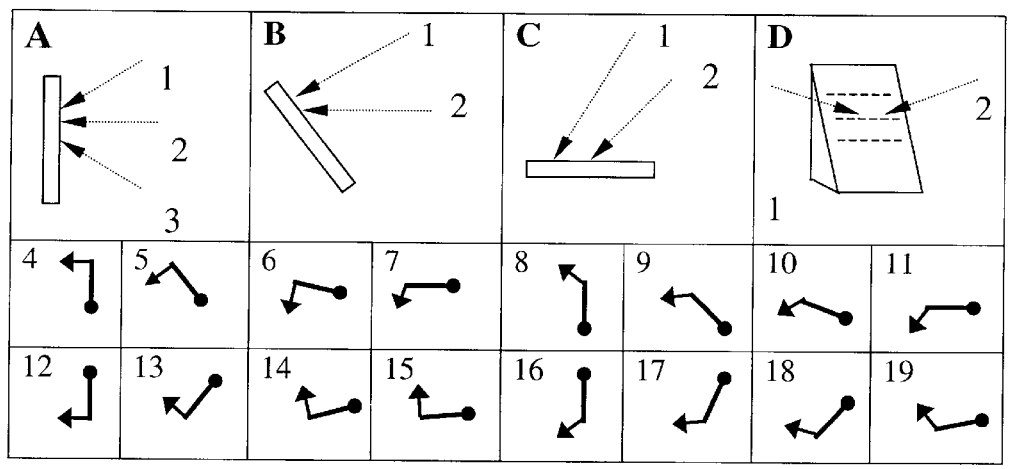
Fig. 4A
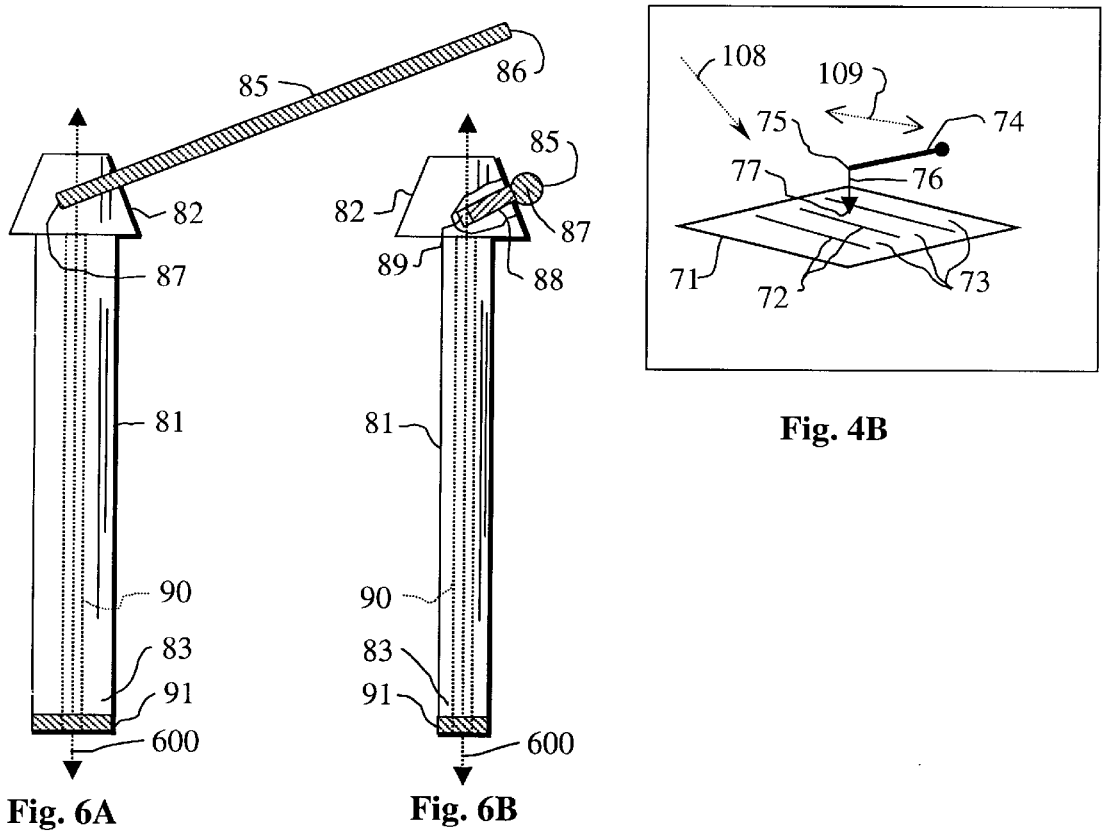
Fig. 4B
Fig. 6A   Fig. 6B

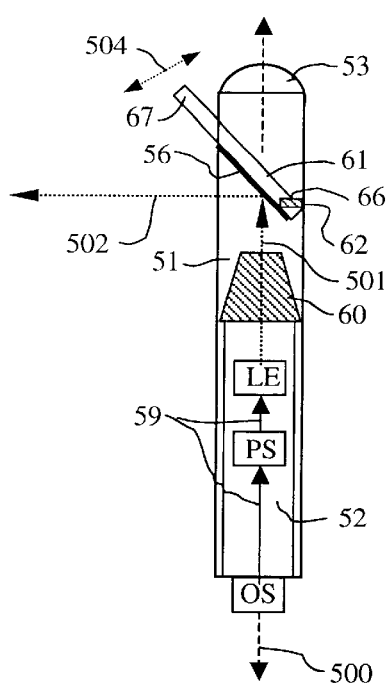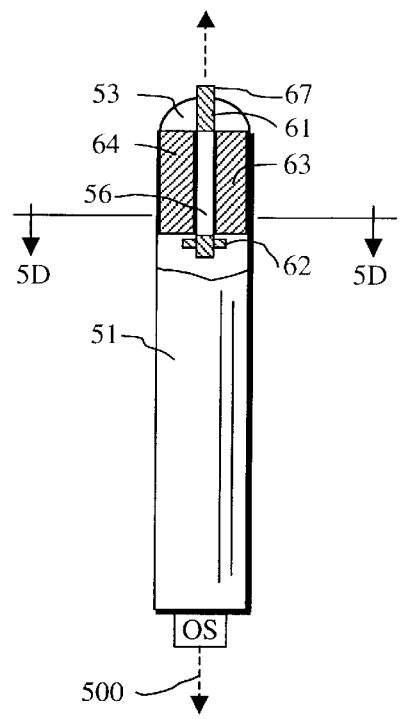
Fig. 5A          Fig. 5B
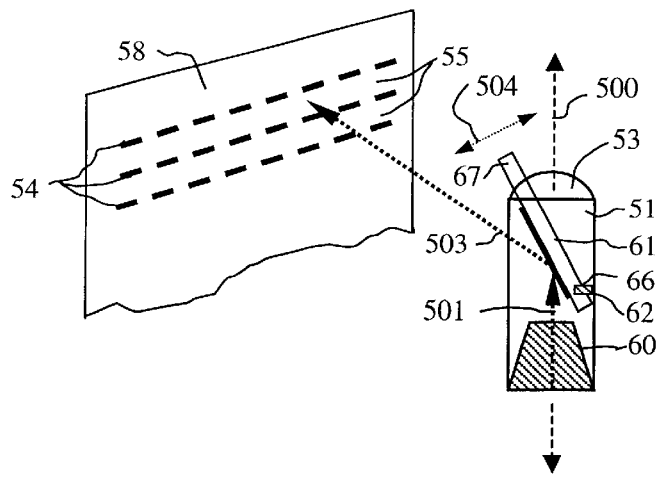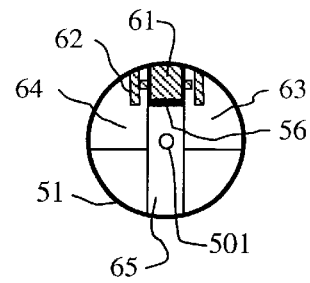
Fig. 5C          Fig. 5D

TEXT LINE UNDERSCORING AND OVERSCORING METHOD AND IMPLEMENTATION DEVICES

CROSS-REFERENCE TO RELATED APPLICATIONS

Not Applicable

STATEMENT REGARDING FEDERALLY SPONSORED RESEARCH OR DEVELOPMENT

Not Applicable

1. Field of Invention

This invention relates to rapid reading methods and reading pointers, and specifically to underscoring methods for the rapid reading of common text, and to devices which implement the methods of underscoring common text.

2. Description of Prior Art

Other than "generic pointers" used as a means of teaching students to read faster, or used by ordinary readers to mark and pace their reading, nothing germane to pointers used in the method of the invention for reading purposes appears to have been patented, sold, or suggested in any material that appears in the public domain. "Generic pointers," that is pointing fingers or objects, such as pens or pencils, are the only known prior art implementation devices that have been commonly used as training or continuous use devices operated in connection with either teaching a student to read faster, or for common use by any reader.

The patent data base reveals that numerous patents have been obtained for "reading devices" in the form of complex mechanisms which all either use the generic method of the prior art, which is to directly, transversely scan text lines with a generic pointer or a light beam, or to sweep a generic pointer in a downwardly disposed, vertical arc across a page of reading material while the generic pointer is held approximately parallel to the reading material by a complex mechanism. None of these diverse patents either imply or otherwise suggest the method of the present invention. Moreover, the prior art of generic pointer utilization appears to teach away from utilizing an indirect or removed method of marking and pacing a reader's position in the reading material, as is done in the method of the present invention.

Those skilled in the art of teaching students faster reading, otherwise know as "rapid reading," or "speed reading," typically teach a reading method wherein a generic pointer, usually a finger or a generic object, such as a pen or other pointing implementation device, is pointed toward the text lines. The pointer tip is then targeted below the text line to be read, i.e., toward the straight, linear space which extends in-between the text lines to be read. The student reader is then taught to move the pointer tip horizontally, left-to-right, through the linear space below the text line, then move the pointer tip downward one linear space as the pointer tip is returned right-to-left. This cyclical, zigzag process of pointer tip movement through the sequential, downwardly disposed linear spaces continues until the end of the page, and begins anew at the start of the next page. The movement of the pointer tip in this manner typically requires that the non-pointing end of the pointer be grasped with the thumb and fingers as the wrist and arm move back and forth to carry the pointer tip in the described zigzag-shuttling and downward movement. The pointer is typically held so that its tip is continuously nearly, or actually touching the surface of the print matter or virtual display monitor text lines being read.

This zigzag-shuttling process of passing a moving pointer tip in an approximately straight, horizontal manner, at an approximately even distance from the surface of the reading material, through the linear spaces below and parallel to the text lines is generally known as "underscoring." An underscoring pointer tip emphasizes the reader's linear space positioning below a text line, thus enabling a reader to position his eyes for the reading of the words above the pointer tip within the linear space. Thus the prior art of rapid or speed reading teaches that underscoring, as a method of both keeping place and pacing left-to-right linear reading, should be a process wherein the words and phrases within a text line are emphasized by passing a pointing finger or object beneath a line of text in the manner just described.

Once a student has learned this method of underscoring and has become a faster reader, he or she may often use an inverted method of underscoring wherein the moving pointer tip is targeted toward the linear space above, rather than below, a text line to be read. To differentiate underscoring from this inverted use process, it will be referred to as "overscoring." Overscoring is performed during awkward circumstances of reading, such as when attempting to read a legal brief while it lies flat on a surface immediately in front of the reader. To avoid arm movement next to his body, the reader may choose to move his hand and wrist above the text lines to be read, invert the pointer, and then bend the wrist to aim the pointer tip downward toward the linear spaces above the text lines. The reader then targets the linear space above the text line to be read and initiates pointer tip movements in the same general manner as described for underscoring. That is, the reader initiates a shuttling-zigzag, downwardly moving wrist and arm movement process that carries the pointer tip in an approximately straight, horizontal manner, at an approximately even distance from the surface of the reading material. An overscoring pointer tip emphasizes the reader's linear space positioning above a text line, thus enabling a reader to position his eyes for the reading of the words below the pointer tip within the linear space. Overscoring is thus the procedural equivalent of underscoring, but is performed from a linear space above a text line rather than below a text line.

The prior art underscoring and overscoring methods are intended to have the reader realize at some level of awareness that his eyes will naturally follow the tip area of the moving pointer while he or she is simultaneously reading the text line. In this way the reader realizes that as the pointer tip is properly controlled at higher rates of shuttling, the reader's eyes will shuttle faster, and he or she will read faster.

In the prior art method, one problem that many people using these types of underscoring or overscoring methods encounter is that the performance of such pointer motions as described above are both tedious and fatiguing to the wrist or arm, and, if done improperly with the fingers, leads to friction burns with the surface of the reading material. Also, when an object, such as a pen, is used to read text at a high rate, the pointer often touches against the surface of the page and makes distracting noises. And as well, many people feel self-conscious about performing the exaggerated wrist and arm motions that are required by these prior art underscoring or overscoring methods. It thus often happens that despite having learned an effective method of underscoring or overscoring text lines to read faster, many students regress to their previous, slower reading habits.

It is also obvious when randomly observing ordinary readers reading in a library and during other reading circumstances, that many such readers frequently utilize a pointer of some kind, typically a pen or pencil, whether reading general or technical material. These readers seem to nearly continuously utilize such pointers apparently because it is preferable to them. That is, they appear to appreciate having the ability to rapidly scan through numerous lines of text presently irrelevant to them, and then use the pointer repeatedly at temporary stopping points for focused concentration on particular key words or phrases before again moving on to a higher scan rate.

Another problem that student and general readers using a pointer from the prior art typically encounter is that they often must confront reading matter in three basic, but very different reading positions. The first position is when the material is laying on a flat surface. The second position is when the material is angled up to a typical 45°, as when it is held in the reader's lap or hands. And the third common position is when the reading material is angled up to a head-on confrontation at 90°, as when holding a book on edge in front of the face or when confronting a computer display monitor mounted directly in front of the face. Each of these positions poses a unique challenge to the reader using a generic pointing means as a method of underscoring or overscoring lines of text to be read. These challenges are then compounded as the reader varies his line of sight with respect to the flat, angled or perpendicular text before him, e.g., by standing, sitting, or moving to various side or prone positions. In many of these circumstances of reading, it becomes increasingly awkward to attempt to use a generic pointer to underscore text lines.

SUMMARY

An improved text line underscoring and overscoring method, and devices used to implement the improved method, having a graspable, longitudinally elongated, control member, which may be grasped between the thumb and fingers at one end, and having an upward-and-downward, movably angleable connection at an opposite control member end, which is further connective with a non-pointing end of an elongated, transverse pointer arm, which pointer arm extends to an opposite pointing end, so that when the thumb and fingers twist the control member in alternating directions, the non-pointing end of the pointer arm will be urged to rotate in alternate directions, irrespective of the upward or downward angle to which it has been set, and the opposite pointing end of the pointer arm will be urged to shuttle left and right at that set angle, so that the opposite pointing end can be utilized by a reader to place in his line of sight with respect to the intervening linear spaces of text lines to be read, and so be enabled to underscore or overscore the text lines to be read.

Objects and Advantages

Accordingly, the primary objects and advantages of the present invention of an improved text line underscoring or overscoring method and its implementation devices, either as an aid to a student's rapid reading training, or as a continuously used assisting device for the general reader when reading, are: a. to provide an improved method of underscoring and overscoring the text lines of common text to be read, utilizing a vertically movably angleable pointer arm which is forced to move in a horizontal arc; b. to provide operational embodiments of the device which implement the improved method; so that, c. the improved method and implementation devices will then easily control the movement of a pointer arm tip during the improved underscoring or overscoring process, irrespective of the angular positioning of the text lines to be read, and irrespective of the reader's line of sight, and which will additionally allow for immediate, temporary stoppage of the pointer tip for accentuating specific words and phrases.

The new method of text line underscoring and overscoring is based on the fact that the brain and eyes process a multitude of sensory informational data simultaneously at different priority levels of awareness. If an observer points a finger at a distant object, the observer has a low level of awareness that his finger is pointing, and a higher level of awareness of the distant object to which he or she is pointing. If the distant object moves and the observer rotates his arm and pointing finger to follow it, the same levels of awareness apply. The observer knows at some level that his arm is turning and that a finger is pointing, but again, the higher level focus is on the object beyond the observer's pointing finger. Thus, irrespective of the angular change in the pointing arm-finger, the observer's mind "looks past" the foreground objects of the arm and pointing finger and only really focuses on the object beyond the pointing finger.

The prior art teaches that underscoring and overscoring should be done in a direct manner using a pointer which is held slightly angled or parallel to the surface of the text, and as close to the text as possible, with the pointer tip being moved horizontally through the linear spaces of the text to be read. The improved method of the present invention reveals that underscoring is performed in a more efficient and effective indirect way when the reader utilizes an adjustably angleable pointer which is swinging across the linear spaces as a transverse, extended radius, or "arm," emanating from a longitudinal axis which is rotating in alternating directions. Since the reader can easily "see past" the moving arc of the swinging pointer tip to focus on the text line extended in the imaginary line being traced beyond the moving radial pointer tip, control over the pointer and its tip is passed to the means by which the pointer is made to swing. Using the new method of the invention, a reader sees past a pointer tip which is being moved in a 90° arc through a linear space, and so is enabled to underscore or overscore text lines in a simpler, more effective, and more comfortable manner.

The improved device of the improved method typically has an elongated, rigid, or flexibly rigid, "control member," which is inclusive of, or further provided with a graspable "control surface" which can be grasped between the thumb and fingers. The control member is the controllable instrumentation by which an angled, radial "pointer arm" is made to swing across the linear spaces of the text lines. This is done by making the non-grasping end of the control member movably angleably connective with the non-pointing end of a pointer, which is then called the "pointer arm" of the control member. When the thumb and fingers twist the control member longitudinally in alternating directions, the non-pointing end of the transverse pointer arm is urged to rotate, and the opposite pointing end of the pointer arm, that is, the pointer tip, shuttles left and right in a 90° arc.

When the reader then aligns the shuttling pointer tip in his line of sight toward the intervening linear spaces of the text lines, the reader's eyes will naturally follow the pointer tip movement as it swings on the swinging pointer arm being rotated in alternate directions by the twisting of the control member, irrespective of the pointer arm angle on its movably angleable connection with the control member. And again, the method and device operates as described because of the way in which the human optical system operates within the brain. Although the pointer tip traces out a shallow arc as it swings on the pointer arm, the reader's eyes naturally focus "past" the moving pointer tip and so focus on the words in the text. The shuttling motion of the pointer tip guides the reader's eye motions in a smooth and continuous, oscillating manner, even as the reader's mind ignores the moving pointer tip and processes the words in the text lines.

The initial, intuitive objections to the use of a shuttling pointer tip for text line underscoring and overscoring are essentially groundless, these speculations being that such a device will be awkward and counter-productive to the reading process. In fact, the very opposite is true: the device provides for the implementation of a more efficient method for improving or maintaining faster reading skills. Moreover, the initial use of the device often produces startling results. When a reader does not expect that his eyes can read lines in a continuous manner, and then experiences it for the first time using the implementation device of the new method, the typical result is mild surprise.

These improvements to a text line underscoring and overscoring method and implementation devices will have the further advantages of providing: a. a pointer arm that can be effectively adjusted to a temporarily held rest angle position for varying reader needs; b. a movably angled pointer arm that is rotatable in alternate directions about a longitudinal axis; c. a smoothly moving pointing tip that is easily controlled in an accurate, non-fatiguing, comfortable way, and which allows smooth and swift continuous sweeps left-to-right, and quick return sweeps right-to-left; d. a pointer arm tip that is easily and quickly stopped beneath troublesome words or phrases; e. a simple, lightweight, efficient, inexpensive, easily operated and controlled, portable text underscoring or overscoring device that can act in lieu of the more difficult to utilize prior art finger and object pointing methods which require tedious, fatiguing wrist or arm movements for effective operation; f. a pointer arm tip which, when properly operated to read text at a high rate, does not touch the surface of the page and make distracting noises, and as well eliminates the possibility of finger friction against the surface of the text.

The invention additionally comprehends alternate embodiments with control members that combine with writing instruments for convenient note-taking, highlighting, etc., and as well comprehends an added-on gripping means for easy text page turning, and so a more continuous reading rate.

And again, it is obvious that many ordinary readers are frequent users of generic pointing means, apparently because it is preferable to them. That is, they appear to appreciate having the ability to rapidly scan through numerous lines of text presently irrelevant to them, and then use the pointer repeatedly as a temporary stopping point for focused concentration on particular key words or phrases before again moving on to a higher scan rate. To such readers, having an inexpensive, portable, durable, reliable, accurate and efficient pointer device operating in terms of the new method which the present invention provides would be extremely useful, and he or she would gain from the numerous other indicated advantages of using the new method and new device on a routine basis. The new method and device would thus have an overall appeal, and be universally useful both to students of rapid reading, and to all readers who frequently use generic pointers to read. The present invention also comprehends numerous alternate embodiments, all of which have the object of providing a simple, lightweight, efficient, inexpensive, durable, accurate, non-fatiguing, comfortable, easily grasped, operated and controlled, portable, text line underscoring or overscoring device.

For economy and clarity in the specification below, the reference term "reader," will be utilized to indicate a person who reads text lines and who is a user of the method or an implementation device of the method of the present invention. Also for economy and clarity, only the reference pronouns "he," "his," or "him," will be used in the specification below, but it should be understood that the reference term "reader," and the reference pronouns cited are intended to refer to both genders. Also, to avoid confusion in the specification below, the term "overscoring" will be used throughout the specification to indicate underscoring which is being done from a linear space above a text line to be read, with the understanding that underscoring and overscoring are the same process being conducted from different positional contexts. And also, for purposes of clarity in the specification to follow, each new addition of a dashed, arrowpointed, directional line will be introduced as either a Single Arrowpoint Line, or SAL, or as a Double Arrowpoint Line, or DAL. Further objects and advantages of this invention will become apparent from a consideration of the drawings and ensuing descriptions thereof.

DRAWING FIGURES

FIG. 1 is a side view of a Prior Art embodiment of a generic pointer.

FIG. 2A is a perspective view of a preferred implementation embodiment shown in use during the underscoring of a page of reading material.

FIG. 2B is a front view of the embodiment of FIG. 2A with a pointer arm along its right side.

FIG. 2C is a left side view of FIG. 2A with a cutaway portion revealing slot 22.

FIG. 4A is a table of diagrammatic operational positions for typical implementation embodiments of the invention.

FIG. 4B is a diagrammatic example of flat surface overscoring being done in terms of the method of the invention.

FIG. 5A shows a side diagrammatic view of an alternate implementation embodiment wherein a light-beam pointer arm has been movably angled to 90°.

FIG. 5B shows a front view of the alternate embodiment of FIG. 5A, 5C with a portion cutaway revealing the inner structure of the top end of the embodiment.

FIG. 5C shows a side diagrammatic view of the embodiment of FIG. 5A wherein a light-beam pointer arm has been movably angled to an upward position.

FIG. 5D shows a top sectional view of FIG. 5B.

FIG. 6A shows a right side view of an alternate implementation embodiment of the invention wherein a cylindrical pointer arm is set on an upward angle.

FIG. 6B shows a rear view of the device of FIG. 6A with a pointer arm set at 90°, an with a portion cutaway to reveal the area of axle pin 88.

REFERENCE NUMERALS IN DRAWINGS

Figure 3A:
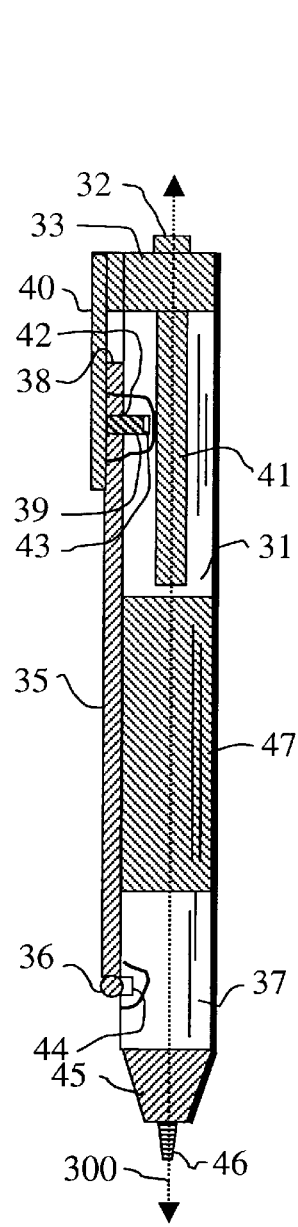
FIG. 3A is a front view of an alternate implementation embodiment wherein the control member is a writing instrument, and with cutaway portions revealing the areas of axle pin 39 and storage hole 44.

Note: For clarity in the Specification, all "Double Arrowpoint Lines" have been abbreviated to the acronym DAL;

and all "Single Arrowpoint Lines," with the exception of those in FIG. 4A, have been abbreviated to the acronym SAL. These two acronyms are then used in the text of the specification only to introduce the element numbers, and omitted thereafter.

FIG. 1
1=generic pointer
2=generic pointing tip
3=generic control end

FIGS. 2A, 2B, 2C
4=human right thumb
5=a right index finger
6=a right middle finger
7=a right ring finger
8=text lines
9=linear spaces
10=top wall of slot 22
11=bottom wall of slot 22
12=rear wall of slot 22
13=right wall of slot 22
14=left wall of slot 22
15=a page of reading material
21=control member
22=rectangular slot
23=control member top end
25=pointer arm
26=pointer tip
27=control member bottom end
28=pointer arm rear end
29=storage hole in hidden lines
30=page gripper
100=DAL indicating longitudinal rotational axis line of control member 21.
101=DAL indicating a left-directed and right-directed arcing swing of pointer arm 25.
102=DAL indicating the up-directed and down-directed arc of pointer arm 25 with respect to axis 100.
103=SAL indicating the counterclockwise rotation of control member 21 on axis 100.
104=SAL indicating the clockwise rotation of control member 21 on axis 100.
105=DAL indicating the left and right lower wobble of control member 21 on axis 100.
106=SAL indicating the left and right upper wobble of control member 21 on axis 100.
107=SAL indicating the lower rearward tilt direction of axis 100 when control member 21 is pivoted forward at the thumb 4 pivot point.
108=SAL line indicating the upper forward tilt direction of axis 100 when control member 21 is pivoted forward at the thumb 4 pivot point.
111=SAL indicating downward arm movement past sequential horizontal text lines in a page of reading material.
112=SAL indicating the direction of pointer tip 26 during a left-to-right swing.
113=SAL indicating the direction of the right-to-left return sweep of pointer tip 26.

Figure 3B:
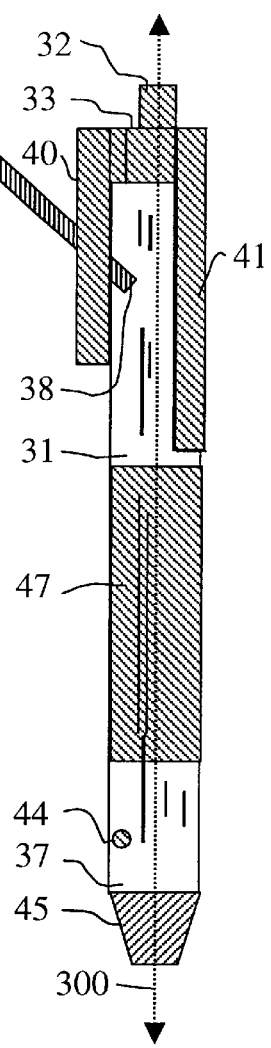
FIG. 3B is a perspective view of the embodiment of FIG. 3A.

FIGS. 3A, 3B
31=control member
33=control member top end
35=pointer arm
36=pointer tip
37=control member bottom end
38=pointer arm rear end
39=axle pin
40=connective compression clip
41=ballpoint pen clip
42=axle pin mounting hole
43=connective axle pin hole
44=pointer tip storage hole
45=conical page gripper
46=ballpoint pen tip
47=designated control surface
300=DAL indicating control member 31 longitudinal rotational axis.

FIG. 4A
Box A=reading material being presented in an upright or vertical position with respect to reader Lines of Sight A-1, A-2, A-3;
Box B=reading material being presented in a typical 45° or inclined position with respect to reader Lines of Sight B-1 and B-2;
Box C=reading material being presented in a flat surface position with respect to reader Lines of Sight C-1, C-2;
Box D=reading material, here shown inclined, which is being viewed from a left Line of Sight D-1 and a right Line of Sight D-2.
Boxes 4 through 19, respectively =diagrammatic illustrations of a pointer arm (with an arrow) connective at different angles with a control member (with a filled circle at the end)

FIG. 4B
71=a page of reading material
72=text lines
73=linear spaces
74=diagrammatic control member
75=top end of diagrammatic control member
76=diagrammatic pointer arm
77=diagrammatic pointer tip
108=SAL indicating line of sight from reader's eyes to 71.
109=DAL indicating left-right shuttle of pointer arm 76.

Figure 7A:
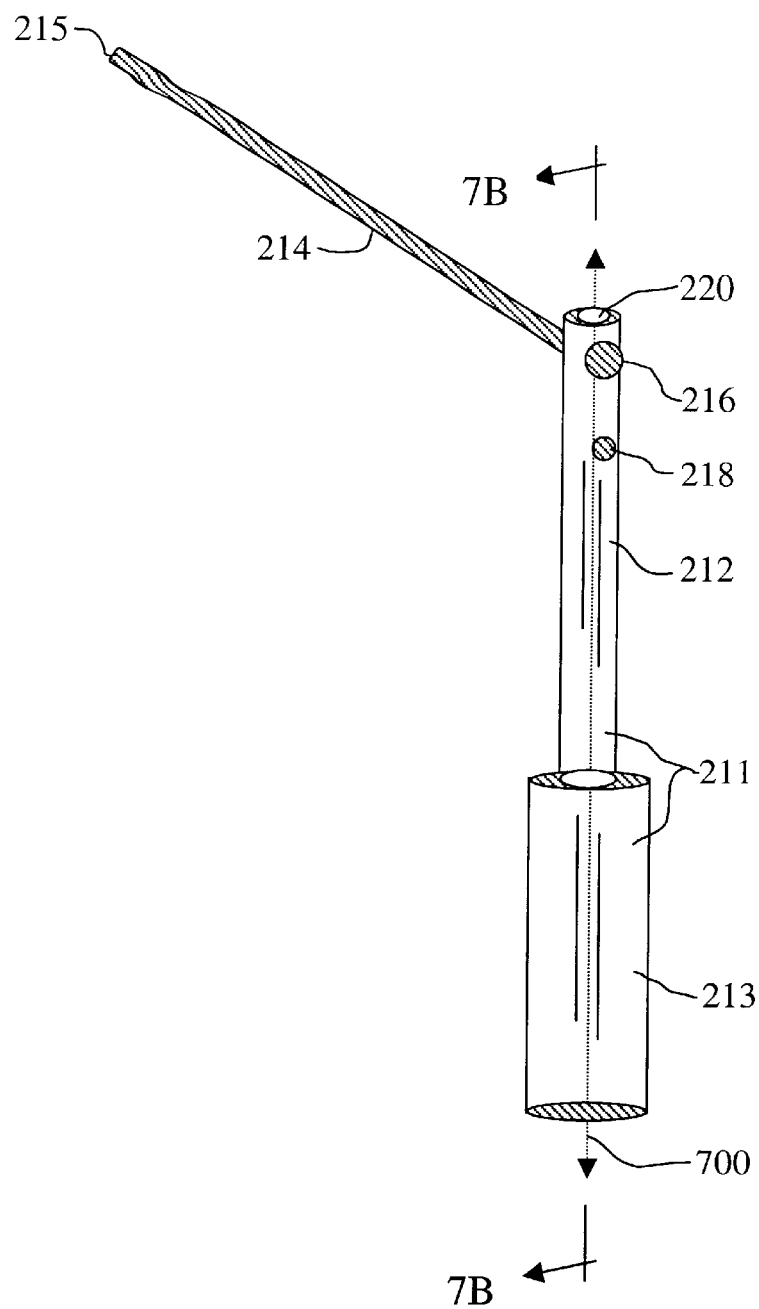
FIG. 7A is a perspective view of a fixed-angle alternate embodiment with a pointer arm set at 90°.
Figure 7B:
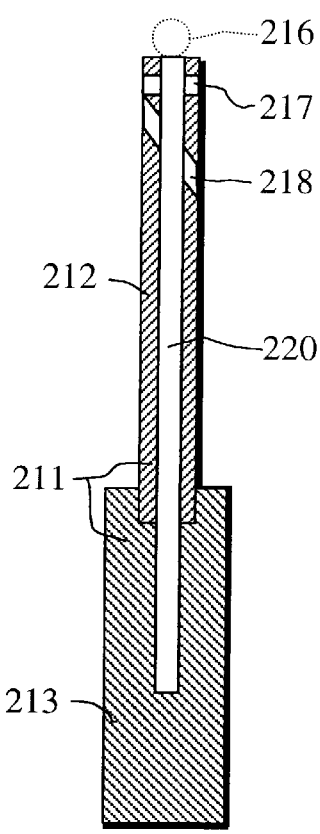
FIG. 7B shows a side sectional view of FIG. 7A.

FIGS. 5A, 5B, 5C
51=control member
52=laser pointer
53=control member top end
54=text lines
55=linear spaces
56=mirror
57=reflective beam tip of SAL 503
58=sheet of reading material
59=connective circuitry
60=conical head of 52
61=levered mirror mounting plate
62=axle hinge
63=left mounting plate friction brace
64=right mounting plate friction brace
65=adjustment slot
66=mounting plate mounting slot 67=top end of plate 61
500=DAL indicating control member 51 longitudinal rotational axis.
501=SAL indicating a laser light beam exit line from light-emitting source LE.
502=SAL indicating a light beam reflective at 90° as a light-beam pointer arm.
503=SAL indicating a light beam upwardly reflective as a light-beam pointer arm.
504=DAL indicating mirror control direction on hinge 62.
PS=portable power source
LE=light-emitting device
OS=on-off switch
FIGS. 6A, 6B
81=rectangular control member
82=control member mounting cap
83=control member bottom end
85=cylindrical pointer arm
86=pointer tip
87=pointer arm rear end
88=axle pin as part of 87
89=axle pin mounting hole in 82
90=storage hole in hidden lines
91=rectangular page gripper
600=DAL indicating longitudinal rotation axis of 81.
FIGS. 7A, 7B
211=control member
212=control member top end
213=control member bottom end
214=pointer arm
215=pointer tip
216=pointer arm knobbed rear end
217=90° cylindrical slot
218=120° cylindrical slot
220=pointer arm storage hole
700=DAL indicating longitudinal rotation axis of 11.

DESCRIPTION—FIG. 1—Prior Art

FIG. 1 is a side view of a generic pointer 1 which exemplifies the generic pointer of the prior art, and may be virtually any larger-order, manually graspable object, such as a pen or pencil, with a designated end used as a generic pointing tip 2 and an oppositely designated generic grasping end, or control end 3. The prior art generic pointer is of a larger order because it is directly grasped with the hand and fingers, as opposed to being indirectly manipulated by other connective means.

OPERATION—FIG. 1—Prior Art

When a generic pointer 1 is used for text line underscoring, its generic control end 3 is typically grasped with a thumb, and index and ring fingers of a hand to form a triangular grasping brace at the generic control end 3. Generic pointer 1 is then enabled to be aimed at a linear space under a text line to underscore the text line. Or, after a slight change in the thumb and finger positions of the aforementioned grasping brace holding the generic pointer, the generic pointer may be used inversely and aimed at a linear space above a text line to overscore the text line to be read.

The required left-to-right, and right-to-left zigzag movement required to underscore or overscore the text lines is then achieved either by manipulating the fingers to move the grasping brace holding the generic control end 3, or by holding the grasping brace tightly and moving the wrist and/or arm back and forth (with the palm either up or down). Any of these manual motions upon the generic control end 3 will effect lateral movement of the generic pointer tip 2 at whatever angle the reader may choose. This angle of the generic pointer 1 is then generally held throughout the reading-underscoring process.

In the prior art method of the pointing of a generic pointer 1 for the purpose of underscoring or overscoring text lines, all control over the pointer tip 2 is in the hand and fingers grasping the generic pointer control end 3. What the improved method will be shown to do is to miniaturize, i.e., significantly reduce the sizing of the generic pointer, and then pass all manual control over the generic pointer to a connective "control member" that will cause the miniaturized generic pointer 1 to become a "movably angleable pointer arm" of the control member. The various ways in which the control member can then be made to move, and so move the miniaturized, movably angled pointer arm and its pointing tip, will be detailed in the specification below. The improved method of the invention thus comprehends the utilization of systematic pointer arm angling and systematic control member manipulation with respect to changing reader lines of sight toward differently angled reading material for the purpose of improved text line underscoring and overscoring.

The preceding, limited explanation also helps to explain why the method of the invention has been unobvious to those skilled in the prior art of generic pointer making and utilization toward the specific purpose of underscoring or overscoring text lines to be read. This is because the type of modified, miniaturized pointer utilized in the present invention would be dismissed from consideration by one skilled in the prior art as being too awkward to hold with the hand while performing underscoring or overscoring in the method of the prior art.

DESCRIPTION—FIGS. 2A–2C—Preferred Embodiment

There are three basic ways in which to structure an implementation device in terms of the method of the invention, each of which employs a geometric arrangement wherein a miniaturized sizing of a generic pointer is made into a transverse "pointer arm" which is further made suitably connective in a movably angleable manner to a portion of a manually rotatable, longitudinal handle called a "control member."

The three ways in which to structure an implementation device in terms of the method of the invention are by having a miniaturized, transverse pointer arm which is movably angleable: a. in a plane bisecting the longitudinal rotational axis of the control member, or; b. in a plane parallel and adjacent to the longitudinal rotational axis of the control member, or; c. in an adjacent plane set at an angle to the longitudinal rotational axis of the control member. In any of these structural contexts, the method of the invention remains the same because a pointing tip of a miniaturized, transverse pointer arm is always used so that only the pointing tip end of a pointer arm is aligned in a straight line of the reader's line of sight between the target point for underscoring or overscoring and the reader's eyes during the rotation of a control member on its longitudinal axis.

The preferred embodiment of FIGS. 2A–2C utilizes a structural geometry wherein a pointer arm 25 is movably angled through a plane which bisects the longitudinal axis DAL 100 of a control member 21. The alternate embodiment of FIGS. 3A, 3B utilizes a structural geometry wherein a movably angleable pointer arm 35 is movably angled in a plane which is parallel and adjacent to a plane which bisects the longitudinal axis DAL 300 of a control member 31. The alternate embodiment of FIG. 6A–6D, utilizes a structural geometry wherein a movably angle able pointer arm 85 is movably angled in a plane set on an angle to the longitudinal axis DAL 600 of a control member 81. In FIGS. 2A–2C, 3A–3B, 6A–6D, the respective linear alignments of a target point, a pointing tip, and a reader's eyes, as the reader's line of sight, all occur in the method of the invention.

FIG. 2A is a perspective view of a preferred implementation embodiment of the invention shown in use during the underscoring of a page of reading material 15. FIG. 2B is a front view of the embodiment of FIG. 2A with a pointer arm 25 along its right side. FIG. 2C is a left side view of the embodiment of FIG. 2A, with a pointer arm 25 shown in an upwardly angled position, and with a partial cutaway revealing rectangular slot 22.

The preferred embodiment of the present invention shown in FIGS. 2A–2C, consists of: a. a rigid, longitudinal, elongated, cylindrically rounded, control member 21; b. a rectangular slot 22, situated slightly below a top end 23 of control member 21, and passing partially through control member 21; c. a lightweight, elongated, flexibly rigid, attachably detachable, planar, transverse pointer arm 25. Pointer arm 25 becomes connective with control member 21 when pointer arm rear end 28 is inserted into rectangular slot 22. Slot 22 allows pointer arm 25 to become movably angleable and have a pivotally frictional coupling with control member 21. Slot 22 is made longitudinally parallel to the longitudinal rotational axis DAL 100 of control member 21, thus causing the inserted pointer arm 25 to bisect axis 100.

Control member 21 is typically made of a solid, cylindrical, dowel-type rod, and made of lightweight plastic, metal, or wood or other composite material, and may be either rigid or flexibly rigid. If control member 21 is made of plastic, or other suitable composite material, it may be made either clear or colored. For the purposes of descriptive clarity, control member 21 has been shown somewhat transparent. Control member 21 is typically made in an overall length range of 11.43 cm (4 ½") to 13.97 mm (5 ½"), but may be made shorter or longer in overall length. Control member 21 is typically made with an outside diameter from 6.35 mm to 15.88 mm (¼" to ⅝"), but may be of slightly lesser or greater diameter. Control member 21 top end 23 and bottom end 27 are shown having been cut at a right angle, but may be otherwise angled.

If one or more portions of the length of control member 21 is altered from being cylindrical, an approximately rounded, or otherwise graspable portion of the length of control member 21, 5.08 mm to 12.7 mm (2" to 5"), will remain toward the lower half of control member 21 and be designated as a "control surface" area suitable for grasping and for a 90° twistable, alternating, longitudinal rotation by a human thumb and fingers. The control surface of control member 21 is that portion of the external surface of control member 21 where the primary manual control over the implementation device occurs. For purposes of discussion of FIGS. 2A–2C, the entire length of the rounded outside surface of control member 21 below slot 22 and above bottom end 27 will be designated as being the "control surface of control member 21."

In the alternate embodiment of FIGS. 3A, 3B, an alternate control surface 47 is designated by markings to differentiate the recommended control surface area from the rest of the length of alternate control member 31. A control surface need not be perfectly cylindrical, but may be only approximately rounded and have polygonal sides which are able to be comfortably held. In alternate embodiments, such as the one exemplified in FIGS. 6A, 6B, the control surface of alternate control member 81 is not rounded, but rectangular, and yet operates in the same general manner as a rounded control surface by being an area of the external surface of a control member suitable for grasping and for a 90° twistable, alternating, longitudinal rotation by a human thumb and fingers, as will be explained.

Pointer arm 25 is a rigid, or flexibly rigid, planar member with a typically rounded or knobbed pointing tip 26 as its terminus, and has a mountable rear end 28. Pointer arm 25 is typically approximately 0.79 mm to 1.59 (¹⁄₃₂" to ¹⁄₁₆") in width, and 3.175 mm to 4.76 mm (⅛" to ³⁄₁₆") in height, and 10.16 cm to 15.1 cm (4" to 6") in length, but may be made slightly thinner or thicker, and lower or higher, and shorter or longer.

In FIGS. 2B, 2C the transverse, rectangular slot 22 is molded or cut into control member 21, and is situated so that its five planar walls, top wall 10, bottom wall 11, right side wall 13, left side wall 14, and rear wall 12, are typically, respectively at right angles to their adjacent walls, but may be otherwise angled. Top and bottom walls 10, 11 are typically set at a right angle to axis 100. Slot 22 side walls 13, 14 are typically set parallel to axis 100.

Attachably detachable pointer arm 25 is connectively attached to control member 21 by introducing rear end 28 into slot 22 until it is either stopped by back wall 12, or until pointer arm 25 has been movably angled within slot 22 to a desired angular position between a typical 90° to 150° angle (FIG. 2A, at DAL 102) relative to axis 100. Rear wall 12 of slot 22 is typically equivalent in size to the front opening of slot 22, and both are typically sized just slightly wider than the width of rear end 28 to provide a frictional engagement of the side walls of pointer rear end 28. The flat planar sides of pointer arm 25 will then engage side walls 13, 14 of slot 22 in a frictional clutching connection which will hold pointer arm 25 in place within the confines of slot 22 and yet also allow for manual inertial movement to a new position where it will then also stay unless acted upon by other forces sufficient to overcome its frictional clutching connection. Side walls 13, 14 are given a height sufficient to allow rear end 28 to be rotatably connective with slot 22 between a typical 90° angle and a typical 150° angle relative to axis 100.

Typically, a page gripper 30 is added onto the bottom end 28 of control member 21. Page gripper 30 is typically a thick, flattened disk or formed into a protruding, rounded shape, and is affixed to the bottom end 27 of control member 21 by adhesive, or other suitable attachment means, and may have equivalent or differing width or diameter dimensions from control member 21. Page gripper 30 is made of rubber, synthetic rubber, vinyl, or other similar materials, and, as will later be better explained, is used for gripping the lead edges of text pages to be turned.

Control member 21 is typically made slightly longer than the length of pointer arm 25 in the length between the bottom of slot 22 and bottom 27 so that when pointer arm 25 is detached from slot 22 by being pulled out of its frictional coupling, storage of pointer arm 25 may be done by insertion into an elongated, longitudinal, storage hole 29 (shown in hidden lines) typically centered on axis 100. In FIG. 2B, pointer arm 25 is shown adjacent and parallel to control member 21, with its narrow side forward to show the sizing relationship between pointer arm 25 and storage hole 29. In FIG. 2C pointer arm 25 is shown wide side forward. Page gripper 30 has a centered, circular hole (shown as an extension of the hidden lines of storage hole 29) matching the larger width of, and aligned with pointer arm storage hole 29. For storage purposes, and to make the implementation device of FIGS. 2A–2C portable, pointer arm 25 is inserted into storage hole 29 rear end 28 first and slid upward into storage hole 29 until pointer arm tip 26 rests against the bottom of page gripper 30.

Typically, text lines are written between 5.08 cm to 15.100 cm (2" to 6"), as dependent upon the book, magazine, newspaper, or type of computer display monitor on which they are written. In the perspective drawing of FIG. 2A, the invention is shown in use underscoring a set of symbolic, dashed text lines 8, wherein each dash is representative of one or more words in a typical text line. A set of linear spaces 9 in-between the set of text lines 8 are respectively intended to exemplify the open, intervening spaces between normal reading text, i.e., in-between consecutive, typically parallel text lines 8 With respect to the operational method of the various implementation devices discussed in the specification, the parallel, linear transverse spaces in-between such lines of text wherein a pointer tip of an implementation device is being targeted (pointing) will be referred to as "the linear spaces of the text lines."

Additionally, FIG. 2A contains drawn, diagrammatic references to a human right thumb 4, a right index finger 5, a right middle finger 6, and a right ring finger 7, all of which will be explained below with respect to the operational method of the invention. And, additionally, FIG. 2A contains drawn references to directional arrowpointed lines, each of which will be explained below with respect to the operational method of the invention.

FIG. 4A is a table of diagrammatic operational positions for typical implementation embodiments of the invention such as are shown in FIGS. 2A–2C, 3A–3B, 5A–5C, 6A–6B, 7A–7B, and is utilized to exemplify: a. the common reading material positions; b. the typical lines of sight for a reader toward the common reading material positions; c. the reference use positions best suited for a. and b. above in terms of the operational method of the invention. The table of FIG. 4A will be referentially utilized to explain how a reader may easily position and manipulate an implementation device to his advantage with respect to changing positions of material to be read and changing lines of sight. FIG. 4B is a diagrammatic example of flat surface underscoring being done in terms of the method of the invention, and will also be referentially used in the explanations below.

In terms of the Table of FIG. 4A, Box A shows reading material being presented in an upright or vertical position with respect to reader Lines of Sight A-1, A-2, A-3; Box B shows reading material being presented in a typical 45° or inclined position with respect to reader Lines of Sight B-1 and B-2; Box C shows reading material being presented in a flat surface position with respect to reader Lines of Sight C-1, C-2; Box D exemplifies inclined reading material which is being viewed from a left Line of Sight D-1 and a right Line of Sight D-2. Boxes 4 through 19 respectively show diagrammatic illustrations of a pointer arm (with an arrow) connective at different angles with a control member (with a filled circle at the end).

OPERATION—FIGS. 2A–2C—Preferred Embodiment

As the explanation of the operation of the main implementation embodiment of FIGS. 2A–2C is given, the symbolic dashed lines exemplifying text lines 8 and the linear, transverse, open spaces in-between such lines, linear spaces 9, on a page of reading material 15, will be utilized to indicate the ways in which control member 21 causes pointer arm 25, and so pointer tip 26, to sweep across linear spaces 9 and so underscore or overscore such lines of text 8. The various directional arrow-pointed lines just mentioned will be utilized to indicate the various directions in which the elements of the implementation device are moving at different points in time under varying circumstances of the operation of the implementation device of FIGS. 2A–2C.

Basic Grasping Method of Implementation Device

In FIG. 2A, the embodiment is representatively shown being held about the control surface of control member 21 by a thumb 4, an index finger 5, a middle finger 6, and a ring finger 7, of a right hand with a right palm (not shown) facing left with a right arm and hand (not shown) holding the device extended slightly outward from the body, with pointer arm 25 directed away from the reader. The thumb 4 is placed against the control surface of control member 21 with the angled thumb nail facing the reader. The angled undersides of the first sections of fingers 5, 6, 7 are placed against the opposite side of the control surface of control member 21, with the respective undersides facing the reader. The thumb and fingers so positioned then grasp the control surface in a slight, but comfortable, squeezing manner. If the reader is left-handed, then the depictions and explanation of the grasp of the control surface of control member 21 would be reversed. In FIG. 2A, pointer arm 25 with pointer tip 26 is shown positionally targeted on an upward angle toward one of the linear spaces 9 of text lines 8.

The stable grasping method shown in FIG. 2A is preferable when the device is to be used in a typically upright and stable operating position. The same stable grasping position will then apply when the device is being used to underscore text lines 8 with the device held in an inverted manner, as will be explained. This stable operating position will apply generally for text lines which are up to a maximum length of approximately 10.16 cm (4"). When text line length is longer than 10.16 cm (4"), a more advanced method of directional control may be used wherein control member 21 is held and manipulated in an altered method. This alternate method is discussed in detail further below.

Operation with Shorter Text Lines

When the reader has determined a desired reading position, i.e., when the reader has placed the reading material at a desired reading angle, either flat on a surface, or on an inclined angle, typically of 45°, or face-on at 90°, pointer arm 25 is movably angled within slot 22 to a temporary rest position at an upward angle (approximately as shown in FIG. 2A) where it will be held by the frictional coupling connection between the planar sides of pointer arm 25 and the planar sides 13, 14 of slot 22 until the angle of pointer arm 25 is again manually, adjustably altered. The reader next grasps the control surface of control member 21 with the thumb and fingers, as described above, and places the device into his unobstructed line of sight toward text lines 8. The desired positioning of the device is found: a. when the arm and hand currently holding the device has been appropriately extended; b. the upward angle of pointer arm 25 has been appropriately adjusted so that pointer tip 26 is reaching just slightly above the surface material on which text lines 8 appear; c. when top end 23 (or, if being used inverted, bottom end 27) of control member 21 is just below, or to the side of the line of sight required for the reader to maintain an unobstructed view of any specific text lines 8 being underscored.

When the desired positioning is attained, the reader will determine for himself what further degree of movably angled rotation of pointer arm 25 is necessary to effectively underscore text lines 8 while maintaining an unobstructed line of sight, and while maintaining a sufficient hand distance to keep pointer tip 26 near, but not touching linear spaces 9. It may be necessary to tip, or "tilt," control member 21 in order to effect the ideal grasping situation for various reading positions, as will be explained below.

The typical angle range for pointer arm 25 for most reading material is 95° to 150° off bottom 27 of control member 21, although a lesser or greater angle may be more suitable under different reading circumstances. If control member 21 is tilted during use (SAL 107, 108), that is, if its longitudinal rotational axis 100 is inclined (by reader preference) toward text lines 8, this will affect the required angular degree of pointer arm 25 to achieve the same overall effect as when control member 21 is held in a straight-up manner. An upward angle of approximately 120° (at 102), which is approximately shown in FIGS. 2A, 2B is typically used to underscore text lines 8 which have their writing surface parallel to the reader's upper body, whether control member 21 is held straight up or tilted slightly forward. Under most reading circumstances, a pointer arm angle of approximately 120° will usually allow the reader to hold the control surface of control member 21 in a comfortable hand and wrist position when grasping and rotating the device between the thumb and fingers. However, every reader will have his own use preferences, i.e., some readers may prefer to keep control member 21 in a near vertical position with a higher angle for pointer arm 25 during operation, while others prefer to tilt it forward and use a lesser angled pointer arm 25.

When the reader has then further rotated pointer arm 25 within slot 22 until it is fully movably angled to a preferred position, the device may be operated by using the thumb 4 and fingers 5, 6, and 7 in the grasping method described above, to slightly twist the control surface of control member 21 back and forth, in a clockwise rotation (at SAL 104), and then in a counterclockwise rotation (at SAL 103) 90°, thereby causing control member 21 to rotate accordingly, and cause slot 22 to rotate accordingly. This will then cause pointer arm 25 and its pointing tip 26 to shuttle accordingly (at DAL 101), i.e., to rotate back and forth, respectively, to the left and to the right.

Once this method of rotational control of the control surface of control member 21 is established, the reader may progress to more accurately targeting pointer tip 26 toward one of the linear spaces 9 beneath one of the text lines 8 that has been chosen to be read. The correct left-to-right movement of pointer tip 26 (at SAL 112) relies on a smooth, continuous, clockwise, rolling, twisting motion (at 104) of the control surface area of control member 21 between thumb 4 and fingers 5, 6, 7. The return sweep of pointer tip 26 (at SAL 113), with control member 21 being twisted counterclockwise (at 103) right-to-left, is done in a smooth, but more rapid manner to the beginning of one of the next lower linear spaces 9 of one of the next lower text lines 8 to be underscored.

Once the basic method of manipulation just described is understood by the reader, the device is then used to continue to underscore text lines 8 by raising pointer arm 26 to a level where it will momentarily rest above the surface of the top line of the material to be read. Pointer tip 26 is then aimed at the left end of the linear space beneath the top text line, and control member 21 is twisted clockwise (at 104), as described above, so that pointer tip 26 moves the full distance left-to-right to the end of the first text line. Then control member 21 is twisted counterclockwise (at 103) as described, to move pointer tip 26 to the beginning of the next lower text line as pointer tip 26 is simultaneously lowered (at SAL 111) into the next lower linear space by slightly lowering the extended arm and hand currently grasping the device. The left-right, zigzag, pointer shuttling motion required to properly underscore each line will then be achieved as the device is continuously twisted back and forth and lowered down text lines 8. The actual 90° twisting motion required for an approximate 12.7 mm (½") diameter control surface of control member 21 is approximately 6.35 mm (¼").

To reiterate, several simultaneous forms of motion are occurring when a reader reads text lines 8 while using the present invention as a guiding means. When control member 21 is being twisted in alternate directions (at 103, 104) to cause pointer arm 25 and so tip 26 to shuttle back and forth (at 101), the device is also simultaneously being moved longitudinally down the page of text lines 8 (at 111) by natural arm motions. As these transverse and longitudinal underscoring motions are occurring, control member 21 may be held parallel to the typically flat plane of text lines 8, but is more often used while being tilted forward with respect to the typically flat plane of text lines 8 in order to minimize downward arm movement (at 111) by bending the wrist and so tilting control member 21 to keep the zigzag, downward-moving process of shuttling pointer tip 26 (at 112, 113) consecutively aligned with the sequential order of text lines 8. The device is also tilted forward to allow the reader to better see over top end 23 of control member 21. As control member 21 is tilted progressively forward from a vertical position (at 107, 108), and as the downward arm motion described progresses down the page (at 111), the arc that pointer tip 26 sweeps out (at 101) progressively changes from an upwardly disposed arc, through a circular arc (when pointer arm 25 passes through a position where it is perpendicular to the planar surface of the text being scanned), through to a downwardly disposed arc as pointer tip 26 tilts progressively forward. The goal of the reader is thus to utilize operational positions for the angle of pointer arm 25, and for the tilt angle of control member 21 which minimize arc height or depth during the downward moving shuttling process, so as to maximize the flattening of the arc toward a straight line. This will provide the reader with the straightest possible path for pointer tip 26 across a targeted linear space. This may be easily done in the several ways explained below.

As the shuttling pointer tip 26 passes in an arc across the linear spaces 9 of text lines 8, the reader's eyes "see past" the arc to the implied line between the endpoints of the arc, i.e., its implied chord line. This implied chord line is where the words being read actually appear, and so the reader visually sweeps across the words at the same rate, and typically with the same linear continuity that the sweeping pointer tip 26 presents for the reader.

The above applies whether control member 21 is currently being used to one side of text lines 8, or generally in front of the reader, to allow the reader to better focus on text lines 8 past the sweep of the pointer tip 26. The twisting and downwardly moving motions of control member 21 will generally remain the same for any reader-preferred reading position and for any angular inclination of text lines 8. What will change more often is the reader's acquired preferential method of tilting control member 21 as the reading-underscoring is being done. This preferential tilting method will typically change with the reader's preferred reading position with respect to the current angular incline of the planar surface of the text lines being read.

Operation with Longer Text Lines

When text lines are longer than approximately 10.16 cm (4"), or when the reader simply prefers the alternate method, control member 21 is held in a less stable bracing method and allowed to cyclically side-tilt, or "wobble," during the alternating twisting process. This side-tilting or "wobbling" effect is used as a means of flattening the arc inscribed by pointer tip 26, and so effect a straighter trace line for pointer tip 26 below or above a longer span of words. To wobble control member 21, the reader assumes the grasping position described above, and then either drops ring finger 7 away from the grasping brace, or moves the nail side of the first section of ring finger 7 to the thumb side of the grasping brace. Once this alternate form of a grasping brace is assumed, as control member 21 is alternately twisted, it will tend to "wobble," i.e., to side-tilt to and fro transversely on axis 100 (at DAL 105, 106), from the pivot point of the less stable grasping brace. When control member 21 is rocked in a wobbling manner (at 105, 106) from the pivoting area of thumb 4 within the grasping brace of thumb 4 and fingers 5, 6, the rocking motion (at 105, 106) is typically left and right, with respect to the surface of text lines 8.

When this rocking or wobbling motion of control member 21 is done as the alternating twisting motion of control member 21 is being done, this will cause pointer tip 26 to sweep left to right in a flattened arc which caries through the longer text line length, irrespective of any typical forward tilt of control member 21. Rocking or wobbling control member 21, as effected by the push and pull of the index finger 5 and middle finger 6, and occasionally by a slight twisting motion of the wrist (not shown), is a useful method of flattening the arc of a pointer arm sweep. It is also a relaxed finger movement that may be continued throughout the reading process without fatigue.

Basic Operational Positions of the Implementation Device

FIG. 4A is a table of diagrammatic operational positions for typical implementation embodiments of the invention such as are seen in FIGS. 2A–2C, 3A–3B, 5A–5C, 6A–6B, 7A–7B. The table of FIG. 4A will be explained to show: a. the common reading material positions; b. the typical lines of sight for a reader toward the common reading material positions; c. the reference use positions best suited for a. and b. above in terms of the method of the invention. The table of FIG. 4A will be referentially utilized to explain how a reader may easily position and manipulate the implementation device to his advantage with respect to changing positions of material to be read and changing lines of sight. FIG. 4B is a diagrammatic example of flat surface underscoring being done in terms of the operational method of the invention, will also be used in these explanations.

In terms of the Table of FIG. 4A, Box A shows reading material being presented in an upright or vertical position with respect to reader Lines of Sight A-1, A-2, A-3; Box B shows reading material being presented in a typical 45° or inclined position with respect to reader Lines of Sight B-1 and B-2; Box C shows reading material being presented in a flat surface position with respect to reader Lines of Sight C-1, C-2; Box D exemplifies reading material, here shown inclined, which is being viewed from a left Line of Sight D-1 and a right Line of Sight D-2. Boxes 4 through 19 respectively show diagrammatic illustrations of a pointer arm (with an arrow) connective at different angles with a control member (with a filled circle at the end). As the explanation continues, each of the Lines of Sight for the respective reading material positions will be explained in terms of the pointer arm-control member diagrams of FIGS. 4A, 4B, as to the typical preferential angle of operation, all in terms of the previously explained methods of operation of pointer arm 25 and control member 21. To avoid redundancy in the explanations, it is to be understood without further reference, that if text lines being read are longer than 10.16 cm (4"), side-tilting, i.e., wobbling, as previously explained as an auxiliary method of control over control member 21, may be introduced by the reader as needed or desired. For the sake of clarity in the following discussion, the hand that controls the implementation device will be referred to as a "steering hand," and an arm that has the steering hand will be referred to as the "steering arm." The initial explanation will be done in terms of the upright use of the implementation device, with pointer tip 26 aimed away from the reader's body, and will be followed by examples of utilization of the device when inverted, with pointer tip 26 aimed away from the reader's body.

Beginning with Box A, when a reader confronts reading material A which is upright or vertical, and his Line of Sight A-1 is from an upper locale, the reader will typically use Position 9 or 10, with the steering arm in front of the body, to minimize the probability of top end 23 of control member 21, or any portion of pointer arm 25 falling into Line of Sight A-1. When the reader's Line of Sight A-2 is from a face-on, typical sitting locale, he will typically utilize Position 8 and move the steering hand and arm straight down the page (at 111), or he will sequentially utilize Positions 8, 9, 10, as he tilts his wrist forward, utilizing the tilt change to minimize downward arm motion. When the reader's Line of Sight A-3 is from a lower locale he will typically utilize Position 8 or 9 with the steering arm in front to avoid having the device obstruct his view.

Referring to Box B, when a reader confronts reading material B which is at 45° or otherwise generally inclined, and his Line of Sight B-1 is from an upper locale, the reader will typically, sequentially use Position 8, 9, 10, 11, as he progressively moves down the page in a progressively tilting manner with his steering arm's elbow (not shown) crooked to the side of reading material B and closing its angle as the reader's steering hand moves progressively down the page. When the reader's Line of Sight B-2 is from a face-on, typical sitting locale, the reader will typically utilize Positions 9 and 10 as he progressively moves down the page in a tilting manner with his steering arm's elbow (not shown) crooked to the side of reading material B and closing its angle as the reader's steering hand moves progressively down the page.

Referring to Box C, when a reader confronts reading material C which is flat, or inclined at less than 45°, and his Line of Sight 1 is from an upper locale, the reader will typically use Position 10, and progressively move down the page with his steering arm's elbow (not shown) crooked to the side of reading material C and closing its angle as the reader's steering hand moves progressively down the page. When the reader's Line of Sight C-2 is from a lower, typical sitting locale, the reader will also typically utilize Position 11, and progressively move down the page with his steering arm's elbow (not shown) crooked to the side of reading material C and closing its angle as the reader's steering hand moves progressively down the page.

Referring to Box D, when a reader confronts reading material D, irrespective of its inclination angle, and reads the text lines on an angle and his Line of Sight D-1 is from the left side, the right steering hand is used in any of the Positions 4 through 111, or if control member 21 is being used inverted, then in any of the Positions 12 through 19, from the right side of the reading material. Any one of the shown Positions 4 through 11 will allow the reader to progressively move vertically down the page with his steering hand and arm to the right of the page and eliminate all view obstruction. A reverse interpretation applies when the reader's Line of Sight D-2 is from the right side of reading material D, i.e., the left hand becomes the steering hand and the left arm becomes the steering arm moving down the left side of the page.

Often it is preferable to use the device for underscoring while it is inverted with the pointer tip 26 faced away from the reader's body. This helps to eliminate view obstruction (by the device) in a Line of Sight when reading material is presented in such a way relative to the reader's locale that the device is in fact obstructive to a clear view of the text. For example, referring to reading material A: Lines of Sight A-1, A-2, A-3, are easily underscored when the device is in inverted Position 18 or 19. Similarly, with respect to reading material B: Lines of Sight B-1, B-2, are easily underscored using any of the inverted Positions 17, 18 or 19. And similarly, with respect to material C: Lines of Sight C-1, C-2, are easily underscored using any of the Positions 17, 18, or 19. However, to effectively read a larger-order piece of reading material C, such as a legal brief, which is lying in a flat position directly in front of the reader, as on a table, as exemplified in the diagrammatic illustration of FIG. 4B, an overscoring method of use is often more preferable to the direct forward-pointing inversion of the device. And again, to overscore text, pointer tip 26 is utilized to trace through the linear spaces 9 above text lines 8 while sequentially reading the respective text lines below the linear space tracing.

In FIG. 4B, a reader's Line of Sight SAL 108 is directly before and focused at a page of reading material 71 containing a set of text lines 72 and a set of linear spaces 73. A control member 74 is grasped in the described manner, but is positioned so that it is horizontal and approximately parallel to the surface of a larger piece of reading material 71, with a top end 75 of control member 74 pointed toward the reader's body. A pointer arm 76 will then be pointing downward and perpendicular to text lines 72 and linear spaces 73. A steering elbow and arm (not shown) are then held to the side and moved from the top of text lines 72 down the page toward Line of Sight 108 as pointer arm 76 is shuttled left and right (DAL 109) with a shuttling pointer tip 77 pointing directly down toward one of the linear spaces 73 above one of the text lines 72 to complete the overscoring process of reading material 71.

Whether a reader prefers to use an implementation device upright or inverted, to underscore or overscore, the same general operational methodology as described above will apply. Or again, as the reader considers his changing preferences for line of sight, inclination of reading material, pointer arm angle, and use of control member tilt and wobble methods, he will determine for himself when it is desirable to utilize the various operational factors just discussed.

Referring again to the embodiment of FIG. 2A, when the embodiment (or any other embodiment done in terms of the method of the present invention) is inverted, clockwise and counterclockwise rotations (at 104, 103) become reversed during the shuttling process of pointer arm 25 (at 101), and the held tilt angle of the inverted control member (at 107, 108) becomes steep toward the horizontal position just described in FIG. 4B. In various reading instances, it is more comfortable, or preferable to the reader, to invert the device using any of the Positions 12 through 19, or to overscore text lines using any of the Positions 4 through 19 which is appropriate for the reading situation.

After using the device for a time the reader will realize that his peripheral vision has increased as he has learned how to take in phrases at a glance. An additional method to rapid reading using peripheral vision that takes in phrases at a glance, is to place pointer arm 25 in a desired angular position so that pointer arm 25 maybe used to vertically slide down a page of text lines while pointer arm 25 is lying horizontally across the text lines. This method may be used for fast scans of a page of reading material to gain a quick perspective on the nature of the material to be read. This method also works well when reading less wide columns of reading material such as are found in newspapers and magazines. Another alternative use of the device is to place control member 21 in an overscoring position and then utilize the extended pointer arm to symbolically divide the text lines 8 (as they are divided by 111 in FIG. 2A) so that the reader's eyes may target left and then right sides of the page and read the text line segments in single glances.

Page gripper 30 is utilized by placing the bottom of the gripper against the approximate top right edge of a right page of written material, such as a book or magazine, which is intended to be turned toward the left. Control member 21 is then pressed downward so that page gripper 30 frictionally engages the surface material of the page. Simultaneously, control member 21 is pushed to the left along with the now frictionally-connective right page until the right page folds and flips over to its opposite side. Alternately, on less foldable reading material, page gripper 30 will only be used to lift the edge of the page away from its underlying page and then lifted, flipped and pushed into place by a grasping finger of the non-steering hand and pushed into place on the left side of the dividing binder means, and then held down on the left side of the book, magazine, etc. Alternately, page gripper 30 may be an attachably detachable, thimble-like rubber boot for a finger, having an attachable detachable connection with control member 21, the purpose of which is to provide friction between a finger's inertial force and the page to be gripped and moved. Page gripper 30 may also be used in conjunction with a suitable rigid bar, such as a plastic ruler or other flat piece of any material (not shown), able to be slid downward across the surface of an open book. Such a flat bar would be utilized to exert pressure against the binding means of a book to better flatten the pages of reading material, and would be controlled by the non-steering hand when using an implementation device in the method just described.

Operation Conclusions

Reader-preferred use positions of an implementation device of the method of the invention are initially determined by the reader's locale and line of sight relative to the current angle of the text lines to be read in the reading material. Generally, the reader will prefer to utilize a position which is both the most comfortable and least obstructive to his line of sight viewing. The choice of a preferred position may also be determined by the reader's ability to utilize tilt, wobble, and arm-elbow angling methods (with the arm and elbow extended out to the side) which will minimize downward arm movements during operation. Ideally, in terms of the method of the present invention, the reader using the implementation device will quickly learn to "see past" a shuttling pointer tip and read the lines of text in a continuous, shuttling manner of eye sweeps, and so increase his reading and comprehension rate accordingly.

From the preceding, it is clear that the text underscoring and overscoring device of the invention provides a highly reliable, lightweight, yet economical device that can be used by almost any reader. Whereas the above description contains many specificities, these should not be construed as limitations on the scope of the invention, but rather as an exemplification of one preferred embodiment thereof. Many other alternate variations of the elements of an implementation device of the method of the present invention are possible, as exemplified below.

DESCRIPTION—FIGS. 3A, 3B—Alternate Embodiment

FIG. 3A is a front view of an alternate implementation embodiment of the invention wherein the control member is a handwriting instrument, and more specifically, wherein a control member 31 is a typical form of ballpoint pen. FIG. 3A has two cutaway portion views which will be explained below. FIG. 3B is a perspective view of the alternate implementation embodiment of FIG. 3A. FIGS. 3A, 3B are additionally intended to exemplify an implementation device wherein a pointer arm 35 with a pointer tip 36 is made to operate within a plane adjacent and parallel to a longitudinal rotational axis DAL 300 of a control member 31.

Often it is desirable for a reader to take notes, highlight material, etc., while reading text lines. Alternately, virtually any implementation embodiment of the method of the present invention may be manufactured to suit the dual purpose of being both a text underscoring or overscoring device and also a handwriting instrument. Alternate embodiments of the invention may be utilized wherein control member 31 has been manufactured into a standard form of handwriting instrument such as various types of ballpoint pens, or other pens, pencils, or highlighters, etc., of almost any typical type, style or design. FIGS. 3A, 3B exemplify this dual-purposed device in use with a typical ballpoint pen body being utilized as control member 31.

Typically, such a combined device as shown in FIGS. 3A, 3B will have opposing or separated, downwardly disposed, compression clips which are set at 90° away from each other. One compression clip will be similar to a typical ballpoint pen clip 4 which is utilized to clip the writing instrument to a pocket or elsewhere. The other clip, a pointer arm connective clip 40, will act as a component of a connective mechanism between pointer arm 35 and control member 31, and will also act as a component of a storage mechanism for pointer arm 35, as will be explained. As shown in FIGS. 3A, 3B, the two downwardly disposed compression clips 40, 41 are set at 90° away from each other to facilitate pocket clipping, and to facilitate the utilization of control member 31 as a writing instrument, as will be explained.

In FIG. 3A, control member 31 is shown as a typical type of plastic or metal, spring-operated, retractable, ballpoint pen, having a typical type of a retractable push-button 32 placed within a top end 33 of a ballpoint pen body of control member 31, with button 32 pushed to an inward position so that a ballpoint tip 46 is extended. A bottom end 37 of control member 31 is just above the ballpoint pen's conical endpiece, which endpiece has been replaced by an alternate form of a conical page gripper 45. Control member 31 has been additionally provided with a second, downwardly disposed, pointer arm compression clip 40, 90° away from its ballpoint pen clip 41. Compression clip 40 houses an axle pin 39 (shown in the top cutaway portion of FIG. 3A). Axle pin 39 is molded into the underside of compression clip 40 and passes through a suitably sized hole 42 (filled by axle pin 39) near the rear end 38 of pointer arm 35. Pointer arm 35 can then become frictionally rotatably connective with control member 31 on the rotational axis of axle pin 39 (as shown in FIG. 3B) and utilize the spring compression of compression clip 40 against the planar sides of pointer arm 35 to maintain a reader-set angle of use.

Pointer arm 35 is typically made of plastic or metal, or other suitable materials. Referring to FIG. 3A, when not in use, pointer arm 35 is rotated parallel to control member 31 and placed into a storage position by sliding a knobbed pointer tip 36 into a storage hole 44 (shown in the lower cutaway portion of FIG. 3A) which has been molded or bored into the material surface of control member 31. Compression clip 40 and storage hole 44 will then secure pointer arm 35 for storage purposes. Knobbed pointer tip 36 is the terminus of pointer arm 35, and is either molded as a metal into the material of pointer arm 35, or, if separately made, is affixed to the end of pointer arm 35 by adhesives or other suitable connective methods. Knobbed pointer tip 36 is additionally a small magnet used for picking up paper clips and other small metal items, making pointer arm 35 a multipurposed device in the same sense that control member 21 is a multipurposed device being both a control member and a writing instrument.

Connective compression clip 40 typically is made of plastic, metal, or other suitable materials in the form of an inverted L, with a typically planar underside to facilitate a frictional coupling between itself, a planar side of pointer arm 35, and the other planar side of arm 35 with the outside surface material of control member 31. Alternately, compression clip 40 may be made in any other material configuration suitable to receive pointer arm 35 at a pivotally connective axle point, and sufficiently compress rear end area 38 of pointer arm 35 into positions for both use and storage.

Approximate to its rear end 38, pointer arm 35 typically has an approximately 0.794 mm (1/32") diameter axle pin mounting hole 42 (filled by connective axle pin 39). When angled out of storage, pointer arm rear end 38 will typically protrude 3.175 mm (1/8") or more out from compression clip 40, so that when pointer arm 35 is rotated in use it will have a fuller portion of material enduring compressional stability from compression clip 40 and will thus remain more stably extended and incur a better frictional coupling advantage for temporary positioning.

Connective compressional clip 40 is typically approximately 5.08 cm (2") in length, 6.35 mm (1/4") wide, and 5.1 mm (1/5") thick where it is downwardly disposed. Connective axle pin hole 43 within control member 31 is typically approximately 0.794 mm (1/32"), and placed approximately in the upper middle portion of the clip. Axle pin 39 is made of plastic or metal and is typically sized to be slightly smaller than the inside diameter of hole 42 within pointer arm 35, and is sufficiently long to reach through hole 42 and thence pass into hole 43. If hole 43 is not present, then axle pin 39 is sized to only touch against the surface material of control member 31.

If the embodiment is generally made of a formable material such as plastic, top end 33 of control member 31 will be formed with clip 40, and, typically, connective axle pin 39 will be formed into the inside, planar wall of clip 40 as a protrusion held in place by spring compression against, or will be additionally inserted into, the material surface of control member 31, as just described. Alternately, connective compressional clip 40 may be made as an addition onto a side of control member 31 by suitable connection methods such as pressure insertion, adhesive or a rivet.

In the method of the invention, geometric structural variations could be made wherein pointer arm 35 operates from a hinged top for control member 31 and is directly operative within the plane bisecting axis 300, or could be alternately structured so that compression clip 40 connects pointer arm 35 in a plane which is set on an angle with respect to axis 300. The operational method of the invention would apply in any and all of these structural contexts as aforementioned, since the use of the method applies whenever a pointer tip remains in the reader's line of sight while being targeted toward a portion of a linear space beneath or above a text line.

A conical page gripper 45 has been provided for the embodiment of FIGS. 3A, 3B in the form of a typical standard conical enclosure which houses a ballpoint pen tip 46. Conical page gripper 45 is made of the same material and operates in the same way as page gripper 30 of FIGS. 2A–2C, and may be used accordingly when ballpoint tip 46 is retracted, as shown in FIG. 3B.

OPERATION—FIGS. 3A, 3B—Alternate Embodiment

The alternate embodiment of FIGS. 3A, 3B carries the essence of the invention in that the operational methods and results are the same as stated in the operation of the preferred embodiment of FIGS. 2A–2C, once prepared for use. To prepare for use, pointer arm 35, if in a storage position, is rotated on axle pin 39 out of its pointer tip storage hole 44, and momentarily rotated outward to 90° to prepare pointer arm 35 for further possible rotation to a more preferred temporary rest position angle where it will be held (until again adjustably altered) by the spring compression of compressive clip 40. Once pointer arm 35 has been movably angled to a desired angle, control member 31 is grasped in the same way as the preferred embodiment of FIGS. 2A–2C. The same movably angleable, operational of pointer arm 35 may be performed, and the same movably rotational operation of control member 31 may be performed, irrespective of the angular orientation of pointer arm 35, or of the changing angular orientations (forward or side tilt) of control member 31 when it is being made twistably movable.

In order to shift from a reading position to a writing position utilizing the embodiment of FIGS. 3A, 3B, the reader makes a finger-pivoting manipulation of the previously described control member grasping brace to a typical, triangulated writing brace. A typical, triangulated writing brace is one wherein a top side of the first section of the middle finger is held as a support base under the pen body, and the thumb and index finger are used at opposite grasping brace angles to complete a triangular writing grip. When the writing process is completed, the triangulated writing brace is manipulated back to the described control member grasping brace. When the device is used as a writing instrument while pointer arm 35 is in a storage position, if the reader/writer rotates pointer arm 35 to a position between his thumb and index finger, pointer arm 35 will not interfere with the triangulated writing brace.

DESCRIPTION—FIGS. 5A, 5B, 5C—Alternate Embodiment

FIGS. 5A–5D exemplify an alternate embodiment of a movably angled pointer arm embodiment of the invention wherein a pointer arm is in the alternate embodiment of a coherent light beam. FIGS. 5A, 5C show side views of a diagrammatic view of the alternate device wherein a laser pointer 52 with a conical head 60 has been inserted within a hollow structure of a control member 51. FIG. 5A also shows a longitudinal coherent light beam SAL 501 emanating from a light-emitting source within laser pointer 52, represented in FIG. 5A by a boxed-in "LE," which has been reflected by a movably angled (at SAL 504), flat, narrow reflective surface, mirror 56, which reflects a vertical angle of incidence of coherent light beam 501 from within a longitudinal rotational axis DAL 500 of control member 51 to a 90° angle of reflection SAL 502. The reflected beam 502 then becomes equivalent to a light-beam pointer arm 502. FIG. 5C shows mirror 56 having been movably angled upward so that the new angle of reflection of incident beam 501 produces another light-beam pointer arm SAL 503. Both reflective light-beam pointer arms 502, 503 then travel outward within a plane bisecting control member 51 axis 500. In FIG. 5C, reflective beam tip 57 is shown striking a sheet of reading material 58 containing a set of text lines 54 and a set of intervening linear spaces 55. FIG. 5B shows a front view of FIGS. 5A, 5C with a cutaway view of the of a top end 53 of control member 51 as it would appear with light beam 501 either turned off or unreflected by mirror 56. FIG. 5D shows a sectional top view of FIG. 5B revealing the quarter-round left and right mounting plate friction braces 63, 64 positioned above H- shaped axle hinge 62 in control member 51. In FIGS. 5B, 5D, a levered mirror mounting plate 61 with narrow mirror 56 is in a fully vertical position, which allows beam 501 to pass through adjustment slot 65 unreflected.

Control member 51 is a thin-walled, hollow tube made of plastic, metal, or other suitable material, and is of sufficient size to accommodate laser pointer 52 by frictional insertion and coupling, and allow the remaining portion of laser pointer 52 with a circuit control on-off button switch, represented in FIGS. 5A, 5B by a boxed-in "OS," to remain outside of the hollow tube of control member 51. Laser pointer 52 is a typical 7.62 mm (3") long laser pointer with a 12.7 mm (½") diameter of the type now commonly used for instructional pointing to a wall-mounted informational display, such as a blackboard. Such a typical laser pointer 52 has within its confines: a standard portable power source, represented in FIG. 5A by a boxed-in "PS," in the form of batteries; a suitable light-beam emitter LE, and a suitable, externally accessible, button on-off switch OS; and, connective circuitry 59, in the form of suitably connective wires or a suitable circuit board, indicated in FIG. 5A by two arrow-pointed lines interconnecting the circuit components LE, PS and OS. Laser pointer 52 is either housed in control member 51, as previously explained, or is manufactured into control member 51. H-shaped axle hinge 62 is manufactured into, or otherwise suitably fastened to the inside wall of the hollow tube of control member 51, and is made of plastic or other suitable materials. The lower end of plate 61 has a suitably sized, horizontal, mounting plate mounting slot 66 (obscured by 62) which snaps onto an axle pin portion of H-shaped axle hinge 62, and thereby become sandwiched within and pivotably, frictionally mounted within the left and right braces 63, 64. Left and right braces 63, 64, are made of plastic or other suitable materials, and manufactured into the hollow tube of control member 51, or otherwise suitably fastened to the inside wall of control member 51. Narrow mirror 56 is typically adhesively connected, or otherwise suitably connected onto plate 61, which is also made of plastic or other suitable materials. Narrow mirror 56 is made approximately 3.175 mm (⅛") wide and 2.54 mm (1") in height, but may be made in other suitable dimensions.

OPERATION—FIGS. 5A, 5B, 5C—Alternate Embodiment

Referring to FIG. 5A, when laser pointer 52 is turned on by on-off switch OS, the activated current passes through connective circuitry 59 from power source PS to light-beam emitter LE which then emits longitudinal light beam 501 which travels upward and strikes narrow mirror 56 on plate 61. Reflective light beam 502 then travels outward as light-beam pointer arm 502 at a reflective angle of 90°, which has been preset by adjustment of mirror 56 on plate 61 (at 504) within adjustment slot 65. Referring to FIG. 5C, when plate 61 has been rotated upward a sufficient distance by pushing or pulling on its exposed top end 67 (at 504), reflective light-beam pointer arm 503 becomes angled upward as well. Referring to FIGS. 5B, 5D, plate 61 incurs friction for temporary positioning from the approximately quarter-round, left and right braces 63, 64, which rub against the sandwiched outside walls of plate 61 of mirror 56 as it is movably angled through adjustment slot 65 (at 504).

In the alternate embodiment of FIGS. 5A–5D, once power source PS of laser pointer 52 has been activated by on-off button switch OS within connective circuitry 59, activated light-beam emitter LE issues coherent incident light beam 501. Light beam 501 then strikes mirror 56 and becomes the equivalent reflective light-beam pointer arm, as exemplified by reflective beams 502, 503. When mirror 56 has been suitably movably angled to a desired reflective angle for a light-beam pointer arm, as exemplified by 502 or 503, control member 51 is grasped in the same way, and the operational results are the same, as those previously stated in the operation of the preferred embodiment of FIGS. 2A–2C as regards the use of the device as a text line underscoring or overscoring method. The same movably angleable, operation of light-beam pointer arms as exemplified by 502, 503 occurs, and the same movably rotational operation of control member 51 occurs, irrespective of the mirrored angular orientation of the light-beam pointer arm, and irrespective of the angular orientation (forward and side tilt) of control member 51 when it is being made twistably movable.

Alternately, a movably angled, light-beam pointer arm embodiment of the invention could be done in various alternate embodiments of a coherent or regular light beam. Such a regular light beam may be in the form of any focused lighting means, such as an incandescent bulb with an appropriate lens focusing means made of glass, plastic, or other composites.

Alternately, rather than utilizing a movably angled mirror, another reflective method such as polished metal surface on a flexible arm may be used to set an appropriate angle for a light-beam pointer arm. And alternately, such a light-beam pointer arm could be an angularly adjustable, flexible fiber optic pointer arm. These latter alternate embodiments would further require: an electric power source, such as a battery; an electric current conduction and connective method, such as a circuit board or wires; an electric switching method, such as an on-off push button or slide switch; an electric light-beam emitting device, such as an incandescent bulb or LED; and, if necessary, a focusing method, such as a lens system of glass or plastic for focusing purposes, so that a produced focused light beam could be produced and utilized as a pointer arm for the invention; and, if necessary, a light-mirroring means, such as a polished metal surface suitably connectively mounted on a flexible tube.

DESCRIPTION—FIGS. 6A, 6B—Alternate Embodiment

In various alternate embodiments of the method of the invention, a pointer arm may be mounted on an angle with respect to a control member longitudinal rotational axis, either directly within, or immediately connective with a control member, or in the context of a suitably connective, extended member projecting from a control member. FIG. 6A shows a right side view of an alternate implementation embodiment of the invention wherein a pointer arm 85 is mounted on an angle with respect to a control member 81 longitudinal rotation axis DAL 600. FIG. 6B shows a rear view of the device of FIG. 6A with a partial cutaway portion revealing the pivotal connections of pointer arm 85 with control member 81.

In FIGS. 6A, 6B, a rectangular control member 81 is shown with a conical shaped mounting cap 82. Referring to FIG. 6B, axle pin 88 is a typically a formed part of an attachably detachable, cylindrical, pointer arm 85, and is placed at the rear end 87 of pointer arm 85. Cylindrical axle pin 88 has been inserted into a cylindrical, angled mounting hole 89 within a mounting cap 82. This then suitably connects pointer arm 85 in a movably angleable, frictional coupling with control member mounting cap 82. Pointer arm 85 can then become frictionally rotatably connective with control member 81 on the rotational axis of axle pin 88, as shown in FIG. 6A. Pointer arm 85 can then also utilize the frictional coupling of axle pin 88 with angled mounting hole 89 to maintain any angle to which pointer arm 85 is temporarily set with respect to axis 600.

Control member 81 may be made as one formed piece with mounting cap 82, or be made separate and be connective by adhesives, pressure insertion, or other suitable connective means, and be made of wood, plastic or any other suitable material. Angled, cylindrical mounting hole 89 may be formed or bored into the material of mounting cap 82. Pointer arm 85 may be made as one formed piece with protruding cylindrical axle pin 88, or be made separately and be made connective with axle pin 88 by adhesives, pressure insertion, or other suitable connective means, and be made of wood, plastic or any other suitable material. The dimensions of the elements of the alternate embodiment of FIGS. 6A, 6B, would be consistent with those given for the preferred embodiment of FIGS. 2A–2C, and with the alternate embodiment of FIGS. 3A, 3B, with the following exceptions. The rectangular sides of FIGS. 6A, 6B are made in various sizing ratios, with a typical maximum width of 6.35 mm (¼") and depth of 11.11 mm (⁷⁄₁₆"). And typically, the grasping or control surface area of the narrow sides of control member 81 will have either friction inducing surface cuts, or a friction-inducing covering, such as an adhesive or rubber banding, to keep the thumb and fingers from slipping from control member 81 when the device is in use.

A cylindrical storage hole 90 for pointer arm 85, shown in hidden lines, is either formed into the material of, or otherwise bored into the material of control member 81, and is of sufficient diameter to accommodate the length of pointer arm 85 up to its axle pin 88.

OPERATION—FIGS. 6A, 6B—Alternate Embodiment

Unlike the previously described embodiments of FIGS. 2A–2C, 3A–3B, 5A–5D, the alternate embodiment of FIGS. 6A, 6B does not utilize an approximately rounded control surface for its control member 81. The operation of the embodiment of FIGS. 6A, 6B is identical to those with more rounded control surfaces, with the exception that the operational process of twisting the control member in alternating directions is done by twisting the rectangular surfaces using the narrow sides of a control member 81, shown in FIG. 6B, to lever the wider sides, shown in FIG. 6A. This is done by placing the thumb on the rear side of control member 81 and placing the fingers on the opposite narrow side of control member 81, and moving the thumb and fingers slightly in alternating directions to effect a 90° rotational twist in opposing directions. This then turns connective axle pin 88 which is further connective with pointer arm rear end 87, and so turns pointer arm 85, and so a pointer tip 86 in a shuttling manner. The fact that pointer arm 85 is mounted on a slight angle with respect to axis 600 of control member 81 does not affect the operation of the implementation device of FIGS. 6A, 6B. When pointer arm 85 has been suitably movably angled to a desired pointing angle, control member 81 is grasped in essentially the same way, and the operational results are the same, as those previously stated in the operation of the preferred embodiment of FIGS. 2A–2C as regards the use of the device as a text line underscoring or overscoring method. The same movably angleable, operational use of pointer arm 85 occurs, and the same movably rotational operation of control member 81 occurs, irrespective of the angular orientation of pointer arm 85, and irrespective of the angular orientation of control member 81 when it is being made twistably movable.

When pointer arm 85 is not in use, it may be placed into storage hole 90 by being inserted, pointer tip 86 first, and pushed into storage hole 90 until rear end 87 with axle pin 88 come to rest against a bottom end 83 of control member 81. A rectangular page gripper 91 has been provided for the embodiment of FIGS. 6A, 6B below bottom end 83. Page gripper 91 has a centered aperture, shown as an extension of the hidden lines of storage hole 90, of sufficient size to snugly accommodate the diameter pointer arm 85. Page gripper 91 is made of the same material and operates in the same way as page gripper 30 of FIGS. 2A–2C, and may be used accordingly when pointer arm 85 is not within storage hole 90.

DESCRIPTION—FIGS. 7A, 7B—Alternate Embodiment

As shown in FIGS. 7A, 7B, in an alternate embodiment of the method of the invention, a pointer arm 214 may be mounted on a fixed angle with respect to a control member 211 longitudinal rotational axis DAL 700. FIG. 7A is a perspective view of a fixed-angle alternate embodiment with pointer arm 214 set at 90°. FIG. 7B shows a left side sectional view of FIG. 7A. FIGS. 7A, 7B exemplify an alternate embodiment of an attachably detachable, fixed-angle, movably angled, cylindrical pointer arm 214. In FIGS. 7A, 7B pointer arm 214 has a non-rounded pointer arm tip end 215, and a knobbed rear end 216. Control member 211 consists of two separate, translucent, cylindrical members made of plastic or other suitable materials which have been inserted one (212) into the other (213). A narrow, cylindrical, control member top end 212 is shown in section in FIG. 7B as being inserted into, a wider, cylindrical, control member bottom end 213, and is typically affixed therein by friction or adhesives.

Cylindrical pointer arm 214 is made of plastic or other suitable materials, and is movably angled on control member top end 212 by having pointer arm tip 215 inserted into and through either of two connective, cylindrical slot receptacles 217, 218, until knobbed pointer arm rear end 216 reaches the outside surface of top end 212. Cylindrical slots 217, 218 are of a suitable size to frictionally accommodate and couple with the outside diameter of cylindrical pointer arm 214. Slots 217, 218 have been drilled, molded or otherwise manufactured into the material of control member top end 212. Slot 217 is set at 90° and slot 218 is set at approximately 140°. Slots 217, 218 allow inserted pointer arm 214 to be movably angled and held in a fixed-angled position. When not in use, attachably detachable pointer arm 214 is stored by being inserted into cylindrical storage hole 220 until its knobbed rear end 216 comes to rest on the top end 212 of control member 11, as also shown by phantom lines in the sectional drawing FIG. 7B. Additionally, a plurality of similar but differently angled slots could be made available for various fixed angles of deployment for pointer arm 214.

OPERATION—FIGS. 7A, 7B—Alternate Embodiment

In the alternate embodiment of FIG. 7, the operational methods and results are the same as stated in the operation of the preferred embodiment of FIGS. 2A–2C as regards the use of the device as a text line underscoring or overscoring method. The same movably angleable, operation of fixed-angle pointer arm 214 occurs, and the same movably rotational operation of control member 211 occurs, irrespective of the fixed-angle orientation of pointer arm 214, or of the angular orientation of control member 211 (forward and side tilt) when it is being made twistably movable.

Alternately, a fixed-angle embodiment of the invention may be made wherein a suitably connective method is utilized, such as fixed-angle clasps or clips, between a pointer arm rear end and a control member approximate top end, so that the connective method is either directly within, or immediately connective with a control member, or in the context of a further suitably connective, extended member projecting from a control member. Alternately, the angled slots 217, 218 of FIGS. 7A, 7B could be replaced in other alternate embodiments by an angled clasping or grasping method suitable for connection with a rear end of a pointer arm. For example, a fixed-angle embodiment of the implementation device of the method could have provided angled slotted receptacles similar to slot 22 in FIGS. 2A–2C, or have provided angled protrusions on control member 211 for a hollow pointer arm end to fit upon, such as pegs or other forms of material protrusions. Alternately, other means of pointer arm configurations could be made suitably connective to a control member by hook and loop, or magnetic attachment, or side clasps, and the like.

CONCLUSIONS, RAMIFICATIONS AND SCOPE

There are many possible alternate combinations of two elongated members, one serving as a graspable, twistable control member and the other as a miniaturized pointer arm, which are made suitably movably angleably connective so as to be enabled to operate in terms of the method of the invention. Similarly, there could be many different storage methods for the respective pointer arms of such embodiments of the implementation device. Many alternate embodiments of the implementation device being utilized as a multiply purposed instrument are also possible. For example, the pointer arm of FIGS. 3A,3B, if suitably manufactured, rather than being a magnetized pick-up tool, could be utilized as a portable, reusable stirrer for fluids. Similarly, control member 31, rather than being a writing instrument as shown, could, if suitably manufactured, be a foldable knife, or a standard flashlight, or virtually any other instrumentation that would maintain the requirements of the method wherein a graspable control surface is provided somewhere on the length of a control member to allow it to be operated in terms of the previously explained methods of the preferred embodiment of FIGS. 2A–2C and the other shown alternate embodiments. Many dual or multiple-function design formats utilizing combinations of pointer arms with common use objects could be made to produce two angularly connected pieces that fall within the operational dimensions and parameters of the implementation device of the invention, and which would operate in the same given connective and operational ways to implement the method of the invention. Additionally, a pointer arm may be made curved, or telescopic, or foldable, or otherwise collapsible and extendible. Similarly, a control members could be made telescopic, or foldable, or otherwise collapsible and extendible, and additionally, could be made in the form of a small graspable and twistable sphere or other operable configurational contour.

At the simplest level, a single member able to be appropriately flexed to allow one end to serve as a graspable, twistable control member, and the other end to serve as a miniaturized, movably angleable pointer arm, could serve to implement the method of the invention. At the next simplest level, a control member could have fixed-angle slots, bore holes, clasps, or other connective, grasping methods. And, since a pointer arm implementing the method of the invention will always be miniaturized and lightweight, and have an operational torque which is minimal, other fixed-angle connective methods such as opposing magnets, or hook and loop connectors, each respectively suitable for connection with the end of an appropriately designed pointer arm could be done. In an intermediately complex embodiment, a variety of suitable connective methods to effect a movably angleable, miniaturized pointer arm in connection with a graspable, twistable control member could be done, i.e., connection methods such as axle pins, friction slots, clasps, clips or hinges, ball couplings, flexible couplings, or pressure couplings, could respectively be utilized to make a device which would be enabled to implement the method of the invention. Also on the intermediate level of complexity, alternate embodiments of the invention may be done as an attachably detachable C or U or other type clasp or add-on collar, or magnetic attachment which fits onto a suitable control member type of object such as a writing instrument, with such clasping methods further having a fixed or rotational connective method, such as a friction hinge or flexible tube.

On the more complex end of the spectrum of possible combinations of a graspable, twistable control member and a miniaturized pointer arm utilizing suitable movably angleable connective methods, two elongated members and suitable connective methods, for those readers whose hands are handicapped in various ways that prevent them from being able to twist with the thumb and fingers, a mechanical, or an electric embodiment of the invention may be made and utilized. A control member could be made to adjustably shuttle a movably angleable pointer arm by mechanical methods, such as a triggering mechanism that when pulled would cause a suitably connective pointer arm to swing to the right and which, when released, would be forced back by an opposing spring force. Or, a control member could be made into an electromechanical device which adjustably shuttles a movably angleable pointer arm by electrical means, such as a triggering switch which, when mounted within a control member, would activate an electrical circuit with a portable power source, such as a battery, to cause a small motor to rotate a reciprocal crank attached to a lever end of a pointer arm. Alternately, in various electromechanical configurations, a solenoid rocker or other appropriate electromotive method could be utilized to swing a pointer arm in the method of the invention.

In the above specification of the basic and alternate embodiments of the improved text line underscoring and overscoring method and its implementation devices, the invention is clearly distinguished from the prior art of the larger-order generic hand-held pointer, or finger pointing means. What clearly defines the differences between the present invention and its prior art in terms of high speed or ordinary reading of text lines is that, in the present invention, minimal effort is required to effect the same underscoring or overscoring result that takes considerable effort when utilizing the finger or a larger-order object as a generic pointing means. Additionally, the present invention addresses the issues of different reading positions by requiring the pointing angle of a pointer arm to be controllably movably angleable, either through fixed-angle changes, or by rotational-angle changes.

The improved text line underscoring and overscoring method and its implementation device allow a new and novel effect to occur, which is the startling act of "seeing past" an oscillating pointer tip to smoothly read text lines at a high rate. The invention also solves the common problem of how to read faster without undue discomfort. The invention also has never been done before in this particular manner for the specific and exclusive design purpose of underscoring or overscoring text lines to be read. The implementation devices of the improved method work properly for the task for which they are exclusively intended, to allow a reader to read more efficiently, but, other than the light-beam pointer arm embodiment, have no other known useful purpose. Other than the light-beam pointer arm embodiment, all of the other implementation devices have intentionally shortened and thinned out pointer arms, which would be useless for any distant objective pointing.

As earlier noted in the discussion of the prior art of reading pointers, the prior art teaches that when a pointer tip is to be used for the specific task of underscoring or overscoring text lines to be read, it is necessary that the pointer tip can be manually controlled in such a way that it passes evenly back and forth, in a zigzag manner, across the linear spaces beneath or above the text lines, and downward through the reading material, at a consistently high rate. The prior art method thus teaches the reader the skill of linear continuity during rapid reading. That is, the prior art method teaches the reader to read without making unrequired eye stops, while also enabling the reader to momentarily stop to re-read certain words or phrases. It is also useful in the prior art method when the pointer tip can be easily manipulated to snap back to its start position at the left side of the text line to reduce the time the eye follows the pointer tip. That is, so that the pointer tip controllably snaps back into position for the next line to be read, and when the pointer tip is enabled to be easily and accurately moved downward through the text as the back and forth sweeping process of pointer tip aiming is occurring. But, as noted, these methods of the prior art are tedious and uncomfortably awkward to utilize.

The improved method of the present invention addresses and resolves each of these issues by having a pointer tip which is enabled to be effortlessly and accurately rotated through the required 90° arc necessary to sweep the pointer tip at a consistently high rate back and forth across the linear spaces between text lines of any print, or virtual print material, and so easily underscore or overscore the text lines. The improved method of the invention promotes a smooth continuous left-to-right motion of the eyes, and allows for quick returns to the left side of the text, and yet also allows for ease of momentary stoppage and rapid repeat scanning of misunderstood portions of text lines. The implementation device of the present invention is as well easily and accurately moved downward through the text as the back and forth shuttling process of pointer tip targeting occurs. Additionally, the present invention is lightweight, comfortable to hold, and virtually effortless to use.

ESSENCE OF THE INVENTION

From all of the drawings, descriptions and accounts of operation of the various implementation embodiments of the present invention cited above, the essence of the invention as an improved text line underscoring and overscoring device is that it typically has:

a. a graspable control member b. which may be grasped between the thumb and fingers at a first end, and which is c. connective at a second end with a first end of d. a movably angleable pointer arm which has been provided with e. a suitably connective mounting method so that the first end of the movably angleable pointer arm can be movably angled within a plane which is within, or adjacent to, or on an angle to, a plane bisecting the longitudinal rotational axis of the control member, which suitably connective mounting method is either f. a pivotably mountable connective method, or g. a fixed-angle mountable connective method, or wherein h. a pointer arm is a movably angleable light beam, so that i. when the thumb and fingers twist the graspable control surface of the control member in alternating directions, the first end of the pointer arm will be urged to rotate, and j. a second pointing end of the pointer arm will shuttle left and right in an oscillating arc, irrespective of the angle to which the pointer arm has been movably angled, whereby, the second pointing end of the pointer arm will be enabled to be moved across a targeted linear space beneath or above a text line while in alignment with a reader's line of sight, and allow a reader to see past the shuttling second pointing end as the device is manually lowered down the text lines, and so underscore or overscore text lines.

What is new and significant about the specified implementation devices of the present invention is that each such device conforms to the specific requirements of the specified method of the invention, beyond which they would have only limited useful purpose. Or again, if devices bearing the specific combination of manufacturing parameters as just specified were made and referred to by others as a "reading device," or "reading pointer," or "pointing device," or the like, each would be, by direct reference or implication, implementation devices of the method of the present invention. Thus the scope of the invention should be determined by the appended claims and their legal equivalents, rather than by the several examples given.

I claim:

1. An improved text line underscoring and overscoring method, comprising:

a. a control member means, graspable between the thumb and fingers at a first end, having a b. movably angleable connective means at an opposite connective end, further connective with c. a first non-pointing end of an elongated pointer arm means, having d. a second pointing end that extends to a terminus which can be aligned with a reader's line of sight toward text lines with intervening linear spaces, so that when said thumb and fingers twist said graspable control member means in alternating directions, said first non-pointing end with said movably angleable connective means of said elongated pointer arm means will be urged to rotate, irrespective of its pivotal angle in its said connection with said suitable movably angleable connective means, and said second pointing end that extends to a terminus of said elongated pointer arm means will be urged to shuttle left and right, whereby, said second pointing end can be utilized by a reader to place in his line of sight with respect to the intervening linear spaces of text lines to be read, and so enable the reader to underscore the text lines to be read.

2. The method of claim 1, wherein said control member means is a writing instrument.

3. The method of claim 1, wherein said pointer arm means has a magnetic tip.

4. The method of claim 1, wherein said movably angleable connective means is a plurality of fixed-angle mounting means for an attachably detachable embodiment of said pointer arm means.

5. The method of claim 1, wherein said movably angleable connective means is a frictionally rotatably connective means.

6. The method of claim 1, wherein said movably angleable connective means is a pivotally frictional coupling connective means.

7. The method of claim 1, wherein said pointer arm means is a light beam.

8. The method of claim 1, further including a suitably connective page gripper.

9. A method for underscoring or overscoring a plurality of sequential text lines having sequential intervening linear spaces between said text lines, using a transverse pointer arm means having a first non-pointing end and a second pointing end, comprising the steps of:

a. providing said second non-pointing end of said transverse pointer arm means with a movably angleable positioning, connective with b. a control member with a twistably rotational longitudinal axis, and c. utilizing said first non-pointing end of said pointer arm means for setting said pointer arm means to a predetermined angle toward said intervening linear spaces below or above said text lines, and d. utilizing said control member with a twistably rotational longitudinal rotational axis to manually shuttle said second pointing end of said pointer arm means in a shallow arc repeatedly through and along said intervening linear spaces in sequentially opposite directions in a zigzag manner through the remaining said intervening linear spaces between said text lines, while moving said shuttling first pointing end sequentially downward through said text lines, whereby, said second pointing end can be utilized by a reader to place in his line of sight with respect to the intervening linear spaces of text lines to be read, and so enable the reader to underscore the text lines to be read.

10. The method of claim 9, wherein said control member means is a writing instrument.

11. The method of claim 9, wherein said pointer arm means has a magnetic pointer tip.

12. The method of claim 9, wherein said movably angleable connective means is a plurality of fixed-angle mounting means for an attachably detachable embodiment of said pointer arm means.

13. The method of claim 9, wherein said movably angleable connective means is a frictionally rotatably connective means.

14. The method of claim 9, wherein said movably angleable connective means is a pivotally frictional coupling connective means.

15. The method of claim 9, wherein said pointer arm means is a light beam.

16. The method of claim 9, further including a suitably connective page gripper.

17. In a reading pointer for use by a reader for reading text lines with linear spaces in-between said text lines, of the reading pointer type that is used by being pointed toward said linear spaces of said text lines to underscore said text lines, an improved text line underscoring and overscoring method, and devices used to implement the improved method, having a graspable, longitudinally elongated, control member, which may be grasped between the thumb and fingers at one end, and having an upward-and-downward, movably angleable connection at an opposite control member end, which is further connective with a non-pointing end of an elongated, transverse pointer arm which pointer arm extends to a second pointing end, so that when the thumb and fingers twist the control member in alternating directions, the non-pointing end of the pointer arm will be urged to rotate in alternate directions, irrespective of the upward or downward angle to which it has been set, and the pointing end of the pointer arm will be urged to shuttle left and right at that set angle, so that the second pointing end can be utilized by a reader to place in his line of sight with respect to the intervening linear spaces of text lines to be read, and so enable the reader to underscore the text lines to be read.

18. The method of claim 17, wherein said movably angleable connective means is a plurality of fixed-angle mounting means for an attachably detachable embodiment of said pointer arm means.

19. The method of claim 17, wherein said movably angleable connective means is a frictionally rotatably connective means.

20. The method of claim 17, wherein said movably angleable connective means is a pivotally frictional coupling connective means.

\* \* \* \* \*